US012513237B2

(12) United States Patent
Ahn et al.

(10) Patent No.: US 12,513,237 B2
(45) Date of Patent: Dec. 30, 2025

(54) ELECTRONIC DEVICE INCLUDING FLEXIBLE DISPLAY FOR SCREEN RECORDING, AND METHOD THEREOF

(71) Applicant: SAMSUNG ELECTRONICS CO., LTD., Suwon-si (KR)

(72) Inventors: Chansu Ahn, Suwon-si (KR); Sooryuh Kim, Suwon-si (KR); Joonhwan Kim, Suwon-si (KR); Seungwook Nam, Suwon-si (KR); Soryang Ban, Suwon-si (KR); Seoyoung Yoon, Suwon-si (KR); Minkyung Lee, Suwon-si (KR); Jaemyoung Lee, Suwon-si (KR); Nayoon Lee, Suwon-si (KR); Seungjin Kim, Suwon-si (KR); Younghak Oh, Suwon-si (KR); Gwanghui Lee, Suwon-si (KR); Kimyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 18/090,312

(22) Filed: Dec. 28, 2022

(65) Prior Publication Data

US 2023/0216948 A1    Jul. 6, 2023

Related U.S. Application Data

(63) Continuation of application No. PCT/KR2022/021089, filed on Dec. 22, 2022.

(30) Foreign Application Priority Data

Jan. 4, 2022   (KR) ......................... 10-2022-0000792
Jan. 19, 2022  (KR) ......................... 10-2022-0008003
Dec. 9, 2022   (KR) ......................... 10-2022-0171712

(51) Int. Cl.
*H04M 1/72454* (2021.01)
*H04M 1/02* (2006.01)

(52) U.S. Cl.
CPC ..... *H04M 1/72454* (2021.01); *H04M 1/0235* (2013.01); *H04M 1/0268* (2013.01); *H04M 2201/38* (2013.01); *H04M 2201/42* (2013.01)

(58) Field of Classification Search
CPC ............ H04M 1/0235; H04M 1/0268; H04M 2201/38; H04M 2201/42; H04M 1/72469;
(Continued)

(56) References Cited

U.S. PATENT DOCUMENTS

2016/0042494 A1   2/2016  Baek
2016/0307545 A1   10/2016 Lee et al.
(Continued)

FOREIGN PATENT DOCUMENTS

CN   109192113   1/2019
CN   113687743   11/2021
(Continued)

OTHER PUBLICATIONS

Search Report and Written Opinion dated Mar. 24, 2023 issued in International Patent Application No. PCT/KR2022/021089.
Extended European Search Report dated Oct. 22, 2024 issued in European Patent Application No. 22919073.1.

*Primary Examiner* — Angelica Perez
(74) *Attorney, Agent, or Firm* — Nixon & Vanderhye P.C.

(57) ABSTRACT

The disclosure relates to an electronic device including a flexible display for screen recording, and a method thereof. The electronic device may include: a memory, a display module including a flexible display, and at least one processor electrically coupled to the memory and the display module. The at least one processor may be configured to: record a screen of the display displayed in an visible area of the display in a reference screen size, based on a screen size (Continued)

of the visible area being changed by extension or contraction of the display during the recording, control the display module to display an object to which a visual effect related to at least one content displayed on the screen is applied, in part of the visible area corresponding to the changed size, and in response to completion of the extension or contraction of the visible area of the display during the recording, control the display module to display an extended or contracted screen in an extended visible area or a contracted visible area.

20 Claims, 27 Drawing Sheets

(58) Field of Classification Search
CPC .......... H04M 1/0241; H04M 1/72454; G06F 2200/1614; G06F 1/1652; G06F 2203/04803; G06F 1/1624; G06F 1/1694; G06F 1/3265; G06F 3/0481; G06F 3/04845; G06F 3/0488; G06F 1/1677; G06F 3/04886; H04N 5/265; H04N 5/772; H04N 23/00; H04N 9/8205
See application file for complete search history.

(56) References Cited

U.S. PATENT DOCUMENTS

| | | |
|---|---|---|
| 2017/0011714 A1* | 1/2017 | Eim .................. G06F 1/1677 |
| 2017/0263217 A1 | 9/2017 | Tomono et al. |
| 2019/0261519 A1 | 8/2019 | Park et al. |
| 2020/0409550 A1 | 12/2020 | Cui |
| 2023/0300435 A1 | 9/2023 | Kim et al. |

FOREIGN PATENT DOCUMENTS

| | | |
|---|---|---|
| KR | 10-2005-0002218 | 1/2005 |
| KR | 10-0672431 | 1/2007 |
| KR | 10-2016-0019293 | 2/2016 |
| KR | 10-2017-0062121 | 6/2017 |
| KR | 10-1833644 | 3/2018 |
| KR | 10-2019-0101184 | 8/2019 |
| KR | 10-2020-0141468 | 12/2020 |
| KR | 10-2022-0078381 | 6/2022 |
| KR | 10-2022-0078419 | 6/2022 |
| WO | 2020/113503 | 6/2020 |
| WO | WO 2020/113503 A1 * | 6/2020 |

* cited by examiner

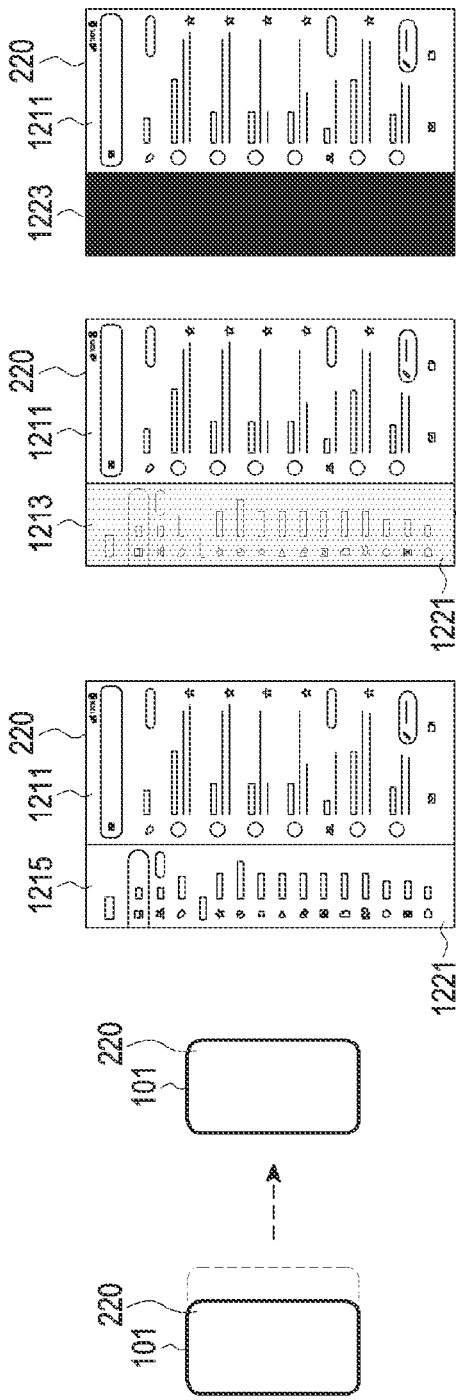
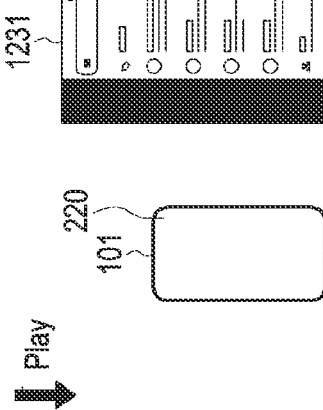
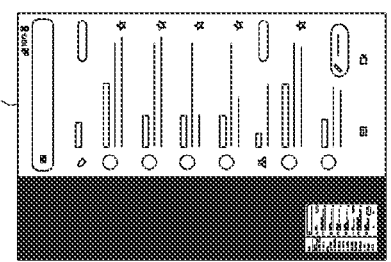
FIG. 12A  FIG. 12B  FIG. 12C  FIG. 12D  FIG. 12E  FIG. 12F

ELECTRONIC DEVICE INCLUDING FLEXIBLE DISPLAY FOR SCREEN RECORDING, AND METHOD THEREOF

CROSS-REFERENCE TO RELATED APPLICATIONS

This application is a continuation of International Application No. PCT/KR2022/021089 designating the United States, filed on Dec. 22, 2022, in the Korean Intellectual Property Receiving Office and claiming priority to Korean Patent Application No. 10-2022-0000792, filed on Jan. 4, 2022, in the Korean Intellectual Property Office, to Korean Patent Application No. 10-2022-0008003, filed on Jan. 19, 2022, in the Korean Intellectual Property Office, and to Korean Patent Application No. 10-2022-0171712, filed on Dec. 9, 2022, in the Korean Intellectual Property Office, the disclosures of all of which are incorporated by reference herein in their entireties.

BACKGROUND

Field

The disclosure relates to an electronic device including a flexible display for screen recording, and a method thereof.

Description of Related Art

In the recent years, electronic devices have been developed into various forms for user convenience, and provide various services or functions. More and more flexible electronic devices (e.g., smartphones) capable of changing the physical shape of a view area have been used. For example, a foldable-type, rollable-type, or slidable-type electronic device may adopt a structure that enables extension or contraction of a view area to provide a large screen by increasing a screen size as needed while maintaining portability.

The mechanical state of a flexible-type electronic device may be changed by an input based on a user action (e.g., sliding-in or sliding-out). For example, the electronic device may be switched from a state in which part of a flexible display is inserted (e.g., contracted) into the electronic device to a state in which the part of the flexible display is withdrawn (extended) to the outside of the electronic device.

A fixed-type electronic device with a fixed-size view area may use a screen recording function in a specified format, and one video file may have one fixed format.

Compared to the fixed-type electronic device, the screen size may be changed at any time in a flexible-type electronic device. When the screen size is changed during screen recording, the flexible-type electronic device may not recognize a recording area properly or the recording area may be cropped.

SUMMARY

Embodiments of the disclosure may provide an electronic device for performing screen recording by reflecting a change in a screen size caused by extension or contraction of a flexible display and applying a visual effect according to the change of the screen size, and a method thereof.

According to an example embodiment of the disclosure, an electronic device may include: a memory, a display module including a flexible display, and at least one processor electrically coupled to the memory and the display module. The at least one processor may be configured to: record a screen of the display displayed in a visible area of the display in a reference screen size, based on a screen size of the visible area being changed by extension or contraction of the visible area of the display during the recording, control the display module to display an object to which a visual effect related to at least one content displayed on the screen is applied, in part of the visible area corresponding to the changed size, and in response to completion of the extension or contraction of the visible area of the display during the recording, control the display module to display an extended or contracted screen in an extended visible area or a contracted visible area.

According to an example embodiment, a method of operating an electronic device may include: recording a screen of a display of the electronic device displayed in a visible area of the display in a reference screen size, based on a screen size of the visible area being changed by extension or contraction of the visible area of the display during the recording, displaying an object to which a visual effect related to at least one content displayed on the screen is applied, in part of the visible area corresponding to the changed size, and in response to completion of the extension or contraction of the visible area of the display during the recording, displaying an extended or contracted screen in an extended visible area or a contracted visible area.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 12A, 12B, 12C, 12D, 12E and 12F are diagrams illustrating an example of screen recording in an electronic device according to an embodiment.

In regard to the description of the drawings, the same or similar reference numerals may denote the same or similar components.

DETAILED DESCRIPTION

An electronic device according to various example embodiments will be described below with reference to the accompanying drawings. The term user as used in various example embodiments may refer to a person who uses an electronic device or a device (e.g., an artificial intelligence electronic device) using the electronic device.

Figure 1:
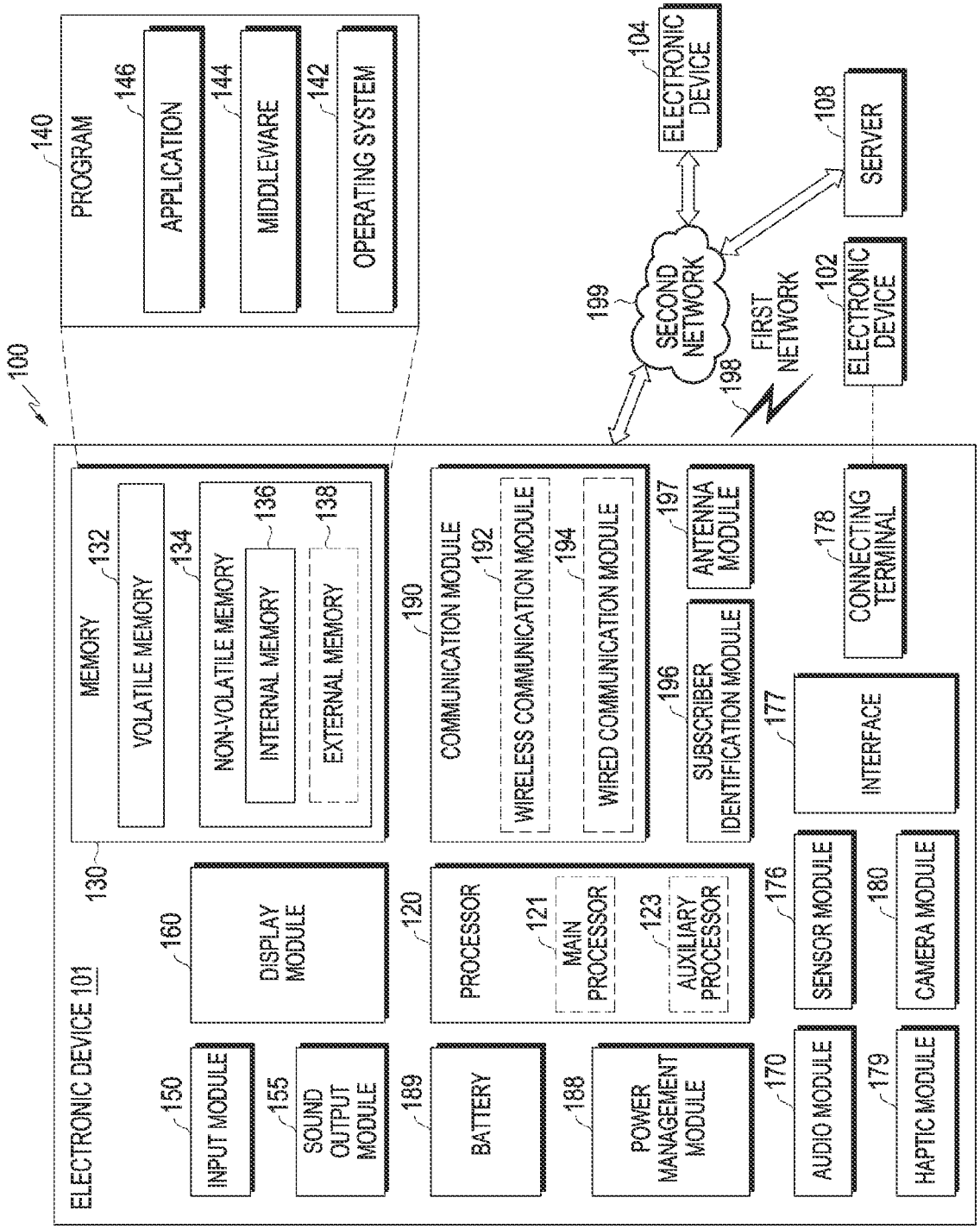
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Referring to FIG. 1, the electronic device 101 (e.g., the electronic device 101 of FIG. 1) according to an embodiment may include the processor 120, the memory 130, the display module 160, and the sensor module 176, and perform a screen recording operation according to extension or contraction of an exposed area (e.g., a visible area) of a flexible display included in the display module 160. The processor 120, the memory 130, the display module 160, and the sensor module 176 included in the electronic device 101 may be electrically and/or operatively coupled to each other to exchange signals (e.g., commands or data) with each other. The sensor module 176 may include at least one sensor for detecting movement (e.g., sliding, folding, unfolding, or rolling) according to extension or contraction of the flexible display.

As such, components of an electronic device have been described in the context of the electronic device 101 of FIG. 1 in an example. However, in an example, all of the components illustrated in FIG. 1 are not essential, and the electronic device 101 may be implemented with more or fewer components than the illustrated ones. In addition, the positions of the main components of the electronic device 101 described above with reference to FIG. 1 may be changed according to an embodiment.

Figure 2A:
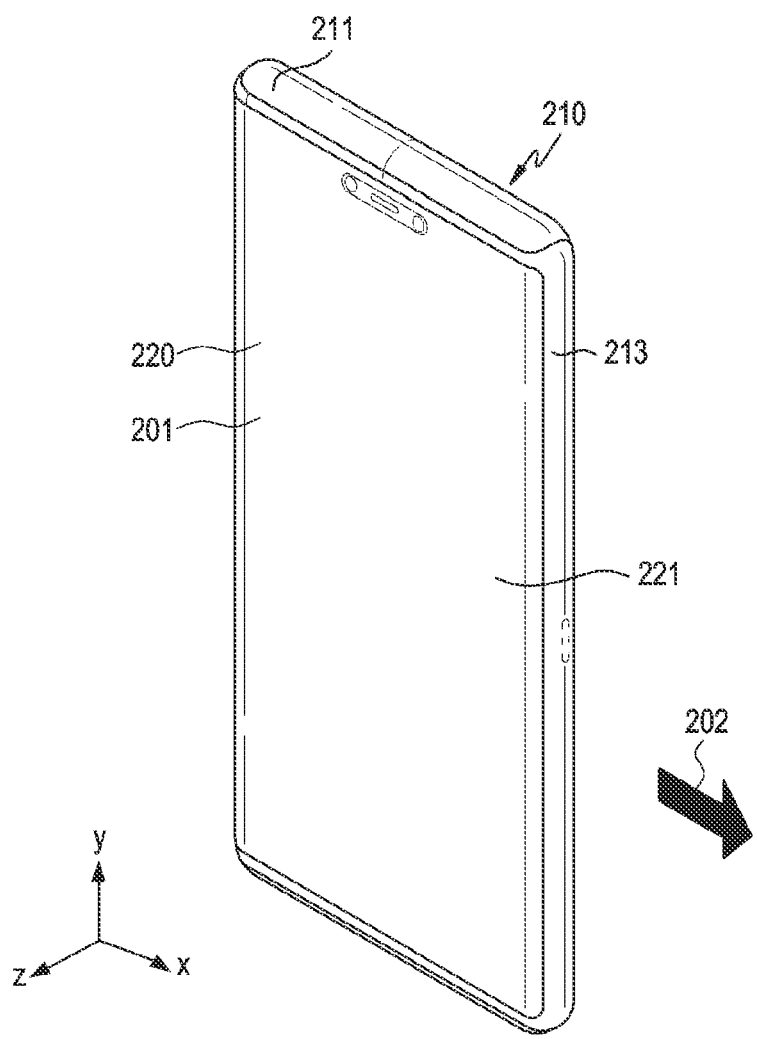
FIG. 2A is a front perspective view illustrating an electronic device in a sliding-in state according to an embodiment.
Figure 2B:
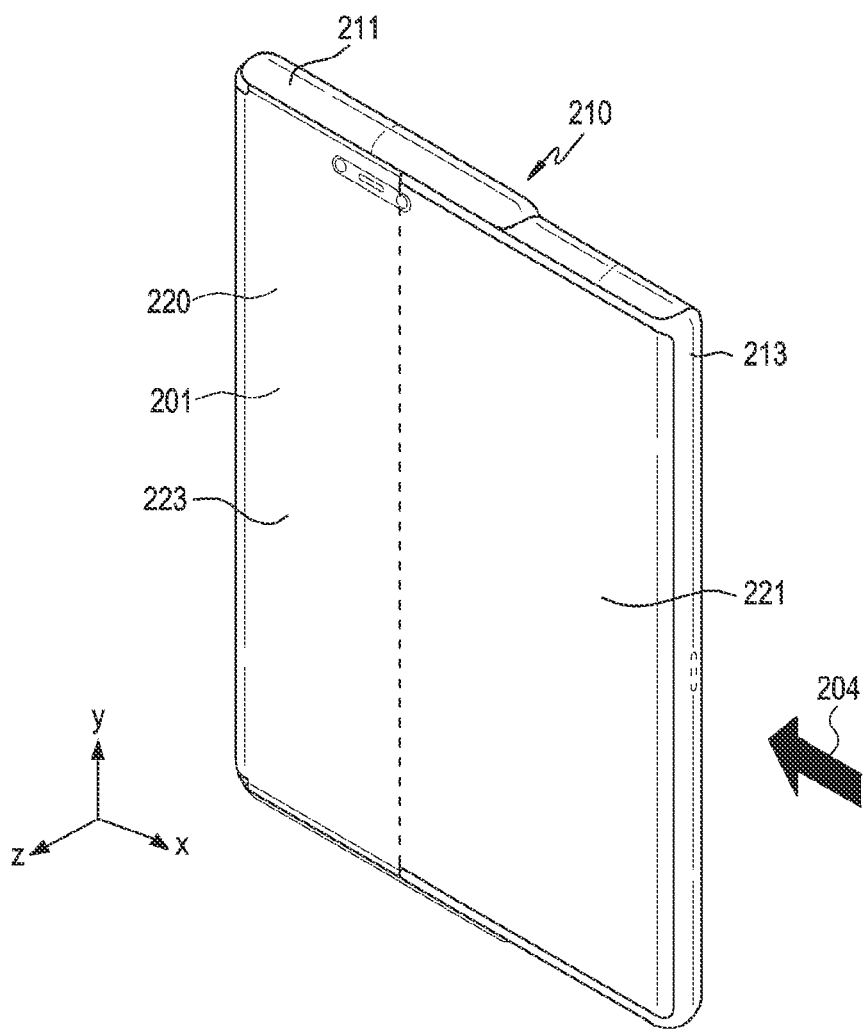
FIG. 2B is a front perspective view illustrating an electronic device in a sliding-out state according to an embodiment.

FIG. 2A is a front perspective view illustrating an electronic device in a sliding-in state according to an embodiment, and FIG. 2B is a front perspective view illustrating the electronic device in a sliding-out state according to an embodiment.

Referring to FIGS. 1, 2A and 2B, the electronic device 101 according to an embodiment may include the display module 160 (e.g., the display module 160 of FIG. 1) that includes, as hardware components, a housing 210, a display 220 disposed to expose some of a plurality of areas on a front surface 201 outside the housing 210, and a display driving module (not shown) for moving the display 220 to expose some of the plurality of areas, the term "expose" as used herein includes "make visible" and is intended to include a situation in which the display includes a cover layer, cover glass or other protective layer. The display 220 may be configured as a flexible display or include a flexible display. The electronic device 101 according to an embodiment may include, as a software component, at least one processor (e.g., the processor 120 of FIG. 1) that controls driving of the hardware components and performs operations or functions for changing (or moving) the exposed area (e.g., a visible area) of the display 220.

According to an embodiment, the housing 210 may be disposed on the front surface 201, surrounding at least part of the periphery of the display 220. For example, the housing 210 may form a partial area of the front surface, a side surface, and a rear surface of the electronic device 101. In another example, the housing 210 may form a partial area of the side surface and a partial area of the rear surface of the electronic device 101. The housing 210 may include a first housing 211 and a second housing 213. The second housing 213 may be coupled with the first housing 211 to be slidable relative to the first housing 211. The second housing 213 may slide in or slide out along a latitudinal direction (contraction or extension direction). For example, a driving source for the sliding operation of the second housing 213 may be driven manually, automatically, or semi-automatically. When the sliding driving source is semi-automatic, a sliding guide member or a sliding driver (e.g., a motor) may be used. When the sliding driving source is automatic, a roller-type guide member or a roller driver (e.g., a motor) may be used. However, the driving source is not necessarily limited to the sliding type or the roller type. When the electronic device 101 is switched from a sliding-in state (e.g., a contracted state of an exposed area) to a sliding-out state (e.g., an extended state of the exposed area) according to a sliding operation of the second housing 213, a second area 223 of the display 220 may be withdrawn from the inside of the electronic device 101. When the electronic device 101 is switched from the sliding-out state to the sliding-in state according to a sliding operation of the second housing 213, the second area 223 of the display 220 may be inserted into the electronic device 101.

According to an embodiment, as the size of an area exposed (e.g., made visible) by sliding-in or sliding-out of the display 220 by the display driving module (hereinafter, referred to as an exposed area or a visible area) is decreased or increased, the size of the exposed area may be changed. As illustrated in FIG. 2A, the display 220 may be disposed such that some area (e.g., a first area 221) configured as a main use area among a plurality of display areas of the display 220 is visually exposed from the front surface 201 of the housing 210 in the sliding-in state.

According to an embodiment, as illustrated in FIG. 2A, the display 220 may be configured such that the first area 221 among the plurality of display areas of the display 220 moves in a movement direction (e.g., a first direction 202) and slides to another exposure position of the front surface 201 by driving of the display driving module (not shown). According to the sliding movement of the display 220, the second area 223 extending from another area (e.g., the first area 221) of the display 220 may be exposed, thereby extending the exposed area. The display 220 may be moved in the first direction 202 by the display driving module (not shown). For example, among the plurality of areas, the first area 221 exposed on the front surface 201 may be used as a main use area, and the second area 223 exposed on the front surface 201 is a sub-use area (e.g., a dummy area). For example, some of the plurality of areas may be accommodated inside the housing 210 without being exposed on the front surface 201, and thus may not be used. According to an embodiment, the display driving module may be driven under the control of the at least one processor 120, and include a roller-type rotation member (not shown) disposed inside the housing 210 and rotating to move the display 220, and a motor (not shown) driving the rotation member (not shown).

According to an embodiment, the display 220 may be coupled with the front surface of the second housing 213 and slide together with the second housing 213. Sliding of the second housing 213 may be understood as sliding of the display 220. The display 220 may be configured to change (e.g., increase/decrease) the size of a screen exposed on the front surface 201 of the electronic device 101 based on the sliding operation of the second housing 213. When the second housing 213 slides out along the first direction 202, the second area 223 of the display 220 may be withdrawn to the outside of the electronic device 101 to increase the screen size of the exposed (e.g., visible) area of the display 220. When the second housing 213 slides in along a direction (e.g., in a second direction 204) opposite to the first direction 202, the second area 223 of the display 220 may be inserted into the electronic device 101 to decrease the screen size of the exposed area of the display 220. The display 220 may move in the first direction 202 by a specified distance according to a sliding operation. The screen size of the area of the display 220 exposed to the outside of the electronic device 101 may be changed (increased or decreased) by the sliding operation. In the sliding-in state, a screen of the display 220 exposed on the front surface 201 of the electronic device 101 may correspond to the first area 221. In the sliding-out state, a screen of the display 220 exposed on the front surface 201 of the electronic device 101 may correspond to the first area 221 and the second area 223. The display 220 may move along the first direction 202 by a specified distance (e.g., an extension distance) by the sliding operation of the second housing 213 with respect to the first housing 211. The screen size of the display 220 may be variable (increased or decreased) in response to the sliding distance.

According to an embodiment, the electronic device 101 may detect a change in the screen size of the exposed area of the display 220 through at least one sensor (e.g., the sensor module 140). For example, the electronic device 101 may detect a sliding distance of the display 220 through the at least one sensor, and detect a change in the screen size of the exposed area of the display 220 based on the detected sliding distance. The electronic device 101 may obtain a sensing value according to the movement of the display 220. For example, the electronic device 101 may detect movement (e.g., rotation) of a rotation structure (not shown, e.g., a hinge) in the first housing 211 through the at least one sensor (e.g., the sensor module 140), and determine whether the second housing 213 has been inserted into or withdrawn from the first housing 211. For example, the electronic device 101 may detect sliding of the display 220 using a distance sensor. The distance sensor may measure a movement distance of the second housing 213. The distance sensor may include, for example, and without limitation, at least one of a time of flight (TOF) sensor, an ultrasonic sensor, a radio wave sensor, or the like. The electronic device 101 may detect a sliding distance of the second housing 213 with respect to the first housing 211 through the distance sensor. In another example, the electronic device 101 may detect the sliding distance using at least one sensor. The at least one sensor may be configured to generate electrical signals that are distinguished from each other in different states (e.g., the sliding-in state and the sliding-out state) in which the degrees of movement of the second housing 213 are different. The at least one sensor may include a Hall sensor and/or a magnet sensor. The electronic device 101 may detect a sliding distance through at least one sensor. The electronic device 101 may detect a change in the screen size of the display 220 based on a sensing value according to movement of the display 220. The electronic device 101 may detect screen rotation of the display 220 according to rotation of the electronic device 101 through at least one sensor.

Figure 3A:
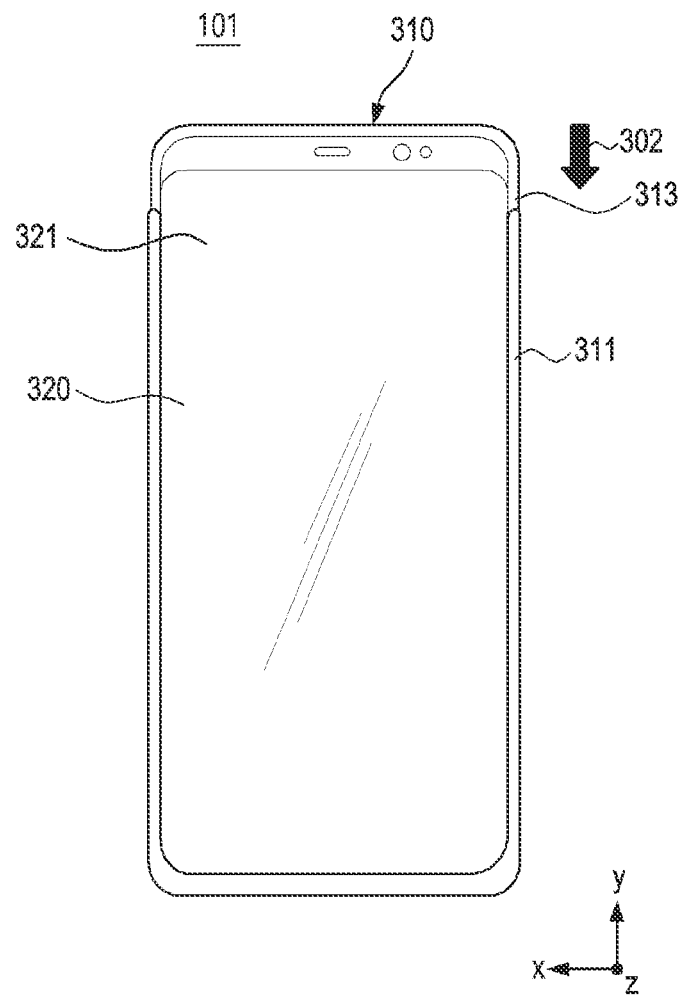
FIG. 3A is a diagram illustrating an electronic device in the sliding-in state according to an embodiment.
Figure 3B:
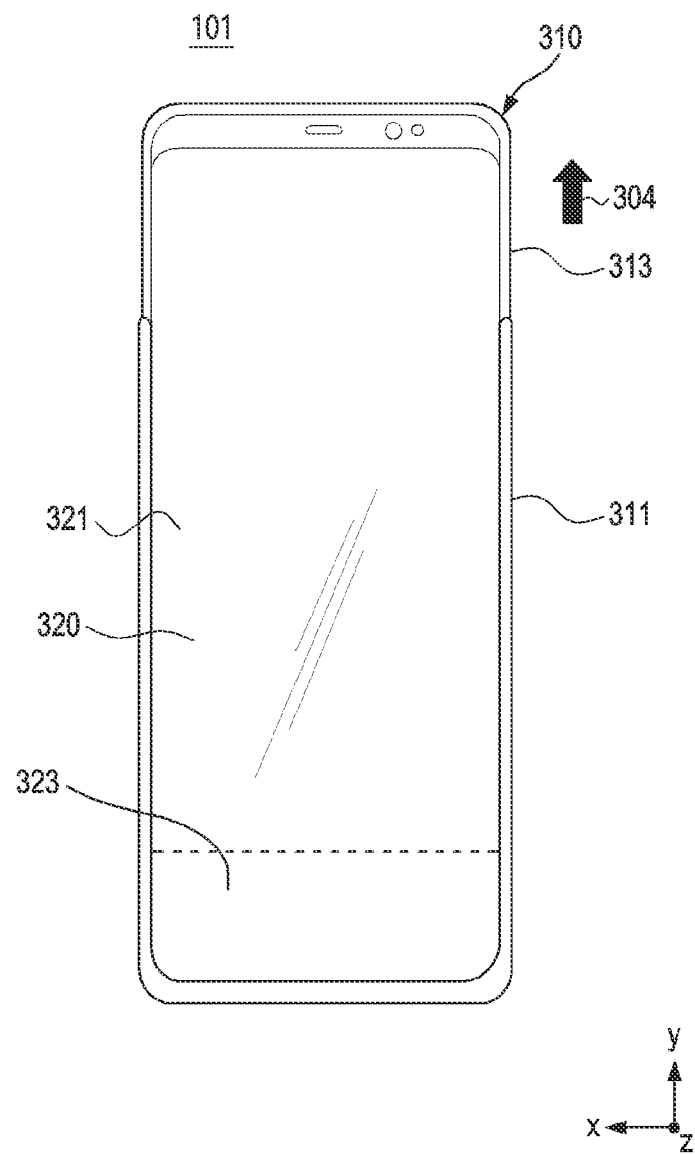
FIG. 3B is a diagram illustrating an electronic device in the sliding-out state according to an embodiment.

FIG. 3A is a diagram illustrating an electronic device in the sliding-in state according to an embodiment, and FIG. 3B is a diagram illustrating the electronic device in the sliding-out state according to an embodiment.

Referring to FIGS. 3A and 3B, according to an embodiment, the electronic device 101, which is a vertically slidable electronic device, may include a display 320 in which an exposed (e.g., visible) area is vertically extendable. A housing 310 may include a first housing 311 and a second housing 313. The display 320 may include a first area 321 and a second area 323. The second housing 313 may slide into the first housing 311 to be inserted into the first housing 311. The second housing 313 may slide out from the first housing 311 to be withdrawn from the first housing 311. For example, a sliding driving source of the second housing 313 may be driven manually, automatically, or semi-automatically. For example, when the sliding driving source is semi-automatic, a sliding guide member or a sliding driver may be used. When the sliding driving source is automatic, a roller-type guide member or a roller driver may be used. However, the driving source is not necessarily limited to the sliding type or the roller type. The second housing 313 may slide into or slid out from the first housing 311 by a guide member. The second housing 313 may slide in (e.g., in direction 304) or slide out (e.g., in direction 302) along a longitudinal direction (e.g., Y-axis direction) of the first housing 311. The second housing 313 may include the display 320 having a flexible structure disposed on a front surface.

The display 320 may be configured to change (e.g., increase/decrease) the size of a screen exposed on the front surface of the electronic device 101 based on a sliding operation of the second housing 313. According to the sliding-out operation, the size of a screen of the display 320 exposed on the front surface of the electronic device 101 may be increased. According to the sliding-in operation, the size of a screen of the display 320 exposed (e.g., visible) on the front surface of the electronic device 300 may be decreased.

In the sliding-in state, the screen of the display 320 exposed (e.g., visible) on the front surface of the electronic device 300 may include the first area 321. In the sliding-out state, the screen of the display 320 exposed (e.g., visible) on the front surface of the electronic device 101 may include the first area 321 and the second area 323. Part of the display 320 may be inserted into or withdrawn from the first housing 311 by a guide member. The display 320 may include the first area 321 that is always exposed, and the second area 323 that is selectively exposed according to a sliding operation. The second area 323 may be inserted into the electronic device 101 according to the sliding-in operation of the second housing 313 or withdrawn from the electronic device 101 according to the sliding-out operation of the second housing 313. The second area 323 may be a screen area extended according to sliding-out of the second housing 313.

FIGS. 4A, 4B, 4C and 4D are diagrams illustrating examples of screen recording in an electronic device according to an embodiment.

Referring to FIGS. 1, 2A, 2B, and 4A, 4B, 4C and 4D, a processor (e.g., the processor 120 of FIG. 1) of an electronic device (e.g., the electronic device 101 of FIGS. 1 and 2) according to an embodiment may record a screen in an exposed area of the display 220. The processor 120 may record the screen of the display 220 based on a reference screen size. The reference screen size may be a screen size of a maximum exposed area based on maximum extension of the display 220.

According to an embodiment, the processor 120 may detect, through at least one sensor in the sensor module 140, whether the screen size of the exposed area of the display 220 has been changed during the screen recording. The processor 120 may record the screen of the exposed area in the reference screen size during the screen recording. When the display 220 is in the contracted state (e.g., the sliding-in state) during the screen recording, the size of the screen (e.g., a first screen) of the exposed area is smaller than the reference screen size, and thus a dummy area may be included as a blank area or an area processed in black in a recorded image. After the screen recording operation is completed, the processor 120 may identify a change in the size of the exposed area from a recording start time to a recording end time.

Figure 4A:
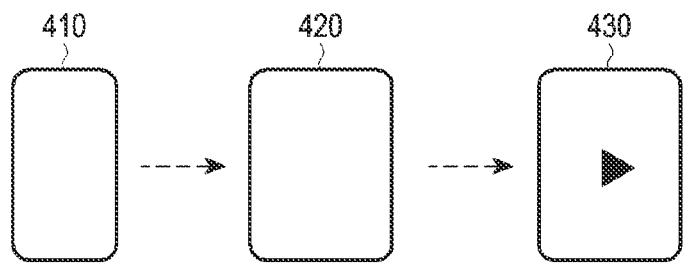
FIGS. 4A, 4B, 4C and 4D are diagrams illustrating examples of screen recording in an electronic device according to an embodiment.
Figure 4B:
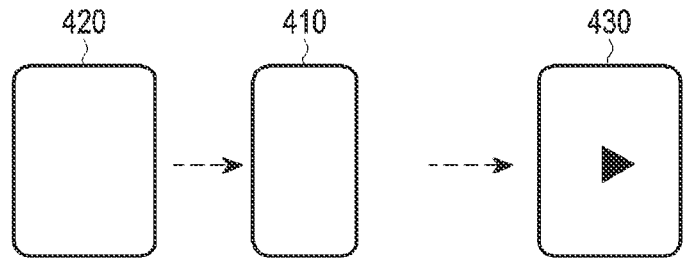
Figure 4C:
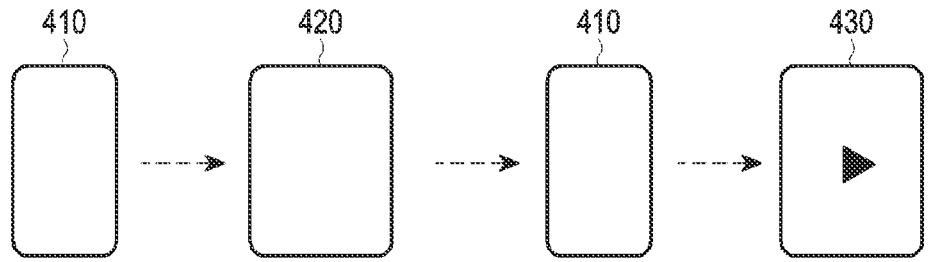

According to an embodiment, when the screen size of the exposed area is changed by extension (e.g., sliding-out) or contraction (e.g., sliding-in) of the display 220 during the screen recording, the processor 120 may store a recorded image 430 of the reference screen size, obtained during the screen recording. As illustrated in FIG. 4A, when the sliding-in state at the start of screen recording is switched to the sliding-out state during recording of a screen of an exposed area 410, a screen of an exposed area 420 is recorded, and then the screen recording is completed, the processor 120 may store the recorded image 430 of the reference screen size. As illustrated in FIG. 4B, when the sliding-out state at the start of screen recording is switched to the sliding-in state during recording of the screen of the exposed area 420, the screen of the exposed area 410 is recorded, and then the screen recording is completed, the processor 120 may store the recorded image 430 of the reference screen size. As illustrated in FIG. 4C, when the sliding-in state at the start of screen recording is switched to the sliding-out state during recording of the screen of the exposed area 410, the processor 120 records the screen of the exposed area 420. When the sliding-out state is switched again to the sliding-in state during the screen recording, the processor 120 records the screen of the exposed area 410. Upon completion of the screen recording, the processor 120 may store the recorded image 430 of the reference screen size. As illustrated in FIGS. 4A, 4B and 4C, when the screen size of an exposed area is changed during screen recording, the processor 120 may generate an image including an object to which a visual effect is applied in a dummy area of a recorded image, and store the generated image as a final recorded image. The processor 120 may generate the object to which the visual effect is applied in response to a display extension (e.g., sliding-out) request or a display contraction (e.g., sliding-in) request during screen recording. While the screen size of the exposed area is being changed, the processor 120 may control the display module 160 to display the object to which the visual effect is applied in the other area (e.g., part of the exposed area corresponding to the dummy area) in which a first screen is not displayed. The processor 120 may record, in the reference screen size, the first screen displayed in the exposed area and the object to which the visual effect is applied. Upon completion of the change of the screen size of the exposed area, the processor 120 may control the display module 160 to display a contracted screen or an extended screen without displaying the object to which the visual effect is applied, and record the contracted screen or the extended screen displayed in the exposed area.

Figure 4D:
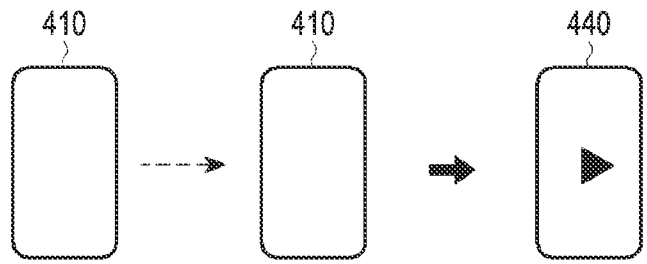

According to an embodiment, as illustrated in FIG. 4D, when the screen size of the exposed area of the display 220 is kept unchanged because the processor 120 maintains the sliding-in state from a screen recording start time to a screen recording end time, the processor 120 may generate a recorded image (440) of a fixed screen size by cropping the dummy area in an image obtained during screen recording, and store the generated recorded image (440) as a final recorded image. The dummy area may be a blank area or an area processed in black in the recorded image, corresponding to a hidden area (e.g., the second area 223 of FIG. 2 or the second area 323 of FIG. 3B) not exposed in the sliding-in state.

Figure 5A:
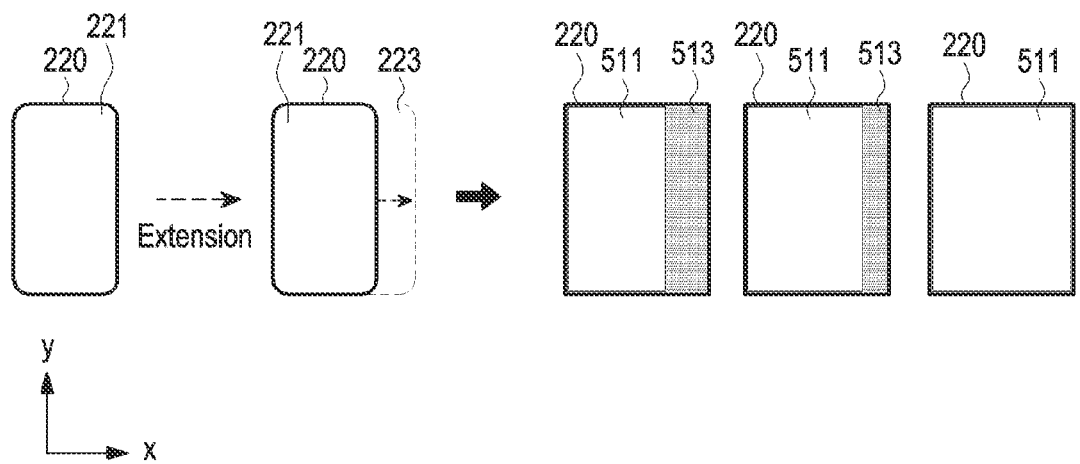
FIGS. 5A, 5B, and 5C are diagrams illustrating examples of screen recording in an electronic device according to an embodiment.
Figure 5B:
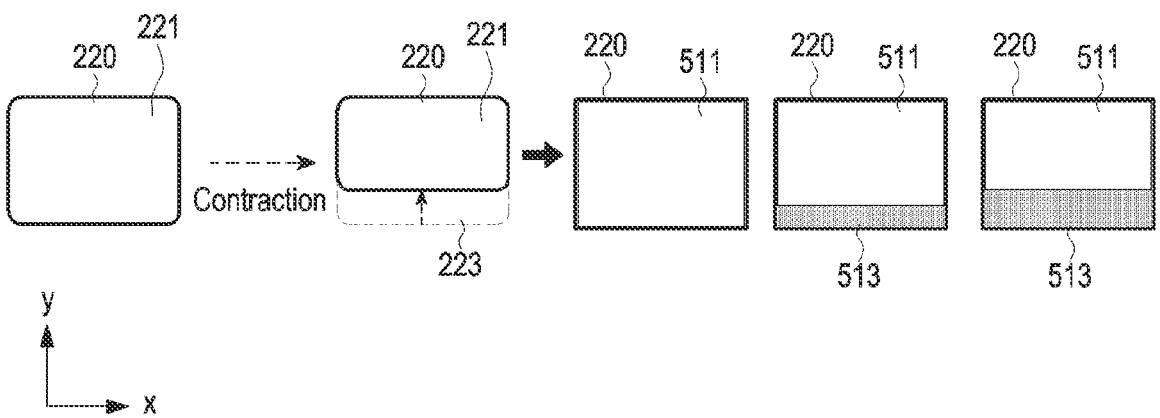
Figure 5C:
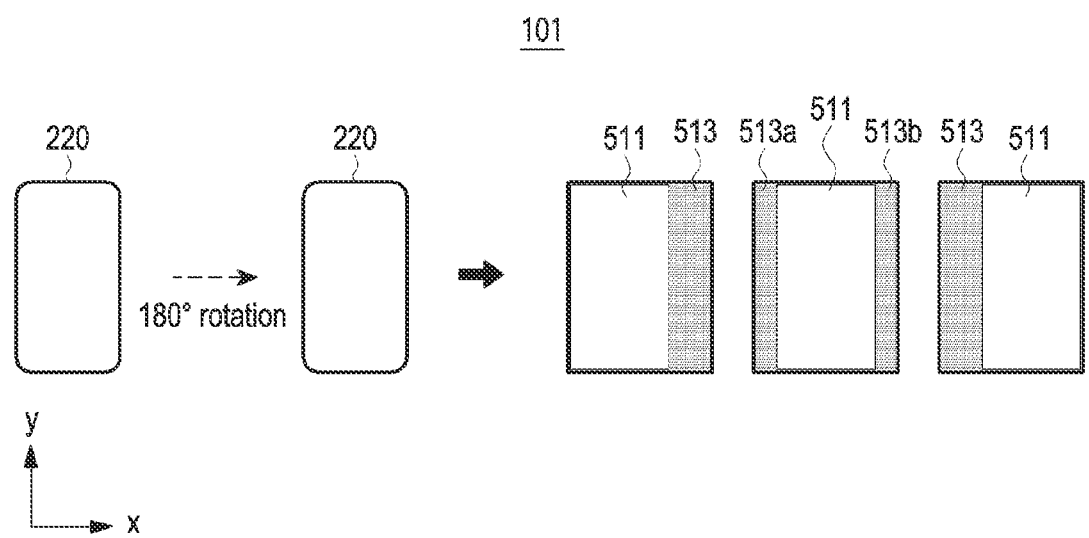

FIGS. 5A, 5B, and 5C are diagrams illustrating examples of screen recording in an electronic device according to an embodiment.

According to an embodiment, as illustrated in FIG. 5A, when the electronic device 101 is switched from the sliding-in state to the sliding-out state by movement of the display 220 in a first direction (e.g., x-axis direction) in a portrait mode (e.g., a state in which the side length of the housing in the y-axis direction is greater than the side length of the housing in the x-axis direction), an exposed area may extend in the first direction to gradually expose the hidden second area 223. Therefore, the exposed area may include both of the first area 221 and the second area 223. During the sliding-out operation, the processor 120 may display a screen (e.g., the first screen) 511 including at least one content, while gradually (e.g., at a specified rate or speed) extending the screen 511. The processor 120 may display an object to which a visual effect is applied in a part 513 of the exposed area, corresponding to a dummy area of a recorded image. For example, the processor 120 may display the object to which the visual effect is applied, while gradually changing the object during the sliding-out operation. When the sliding-out operation is completed, the processor 120 may control the display module 160 to display the screen 511 extended to the maximum screen size of the exposed area.

According to an embodiment, as illustrated in FIG. 5B, when the electronic device 101 is switched from the sliding-out state to the sliding-in state by movement of the display 220 in a second direction (e.g., y-axis direction) in a landscape mode (e.g., a state in which the side length of the housing in the x-axis direction is greater than the side length of the housing in the y-axis direction), the exposed area may be contracted in the second direction to gradually contract the second area 223. Therefore, the exposed area may be contracted. During the sliding-in operation, the processor 120 may display the screen (e.g., the first screen) 511 including at least one content, while gradually contracting the screen 511. The processor 120 may display an object to which a visual effect is applied in the part 513 of the exposed area, corresponding to the dummy area of the recorded image. For example, the processor 120 may gradually display the object to which the visual effect is applied, while gradually changing the object during the sliding-in operation. When the sliding-in operation is completed, the processor 120 may control the display module 160 to display the screen 511 contracted to the screen size of the first area 221 in the exposed area.

According to an embodiment, as illustrated in FIG. 5C, when the electronic device 101 rotates 180 degrees in the portrait mode, the screen 511 of the first area to be recorded may gradually move according to the rotation. Accordingly, the position of the part 513 (parts 513a and 513b) of the exposed area corresponding to the dummy area of the recorded image may be changed. The processor 120 may display an object with a visual effect applied to the part 513 of the exposed area corresponding to the dummy area of the recorded image.

According to an embodiment, the processor 120 may identify the dummy area corresponding to the difference between the screen size of the exposed area and the reference screen size in the recorded image during screen recording, and generate an animation related to at least one content included in the screen of the exposed area. The processor 120 may store a final recorded image in the memory 130 by including the generated animation in the dummy area of the recorded image.

According to an embodiment, when the second area 223 hidden by the sliding-in operation is exposed, the processor 120 may control the display module 160 to display the generated animation in the dummy area, and record both of the screen displayed in the exposed area and the animation displayed in the dummy area. When the extension of the exposed area is completed during screen recording, the processor 120 may control the display module 160 to display the extended screen in the extended exposed area. For example, as the exposed area is gradually extended, the processor 120 may identify that the dummy area is gradually contracted, and control the display module 160 to display the animation that is gradually contracted in response to the contraction of the dummy area. For example, the processor 120 may display the animation in a dummy area having a fixed size corresponding to the exposed second area 223, and after the specified time elapses (e.g., the extension of the exposed area is completed), control the display module 160 to display the extended screen on the entire exposed area including the first area 221 and the second area 223.

According to an embodiment, when the exposed second area 223 is inserted into the housing by the sliding-in operation, the processor 120 may control the display module 160 to display the generated object to which the visual effect is applied in the dummy area, record both of the screen displayed in the exposed area and the object to which the visual effect is applied, and store the recorded image as a final recorded image. For example, the processor 120 may control the display module 160 to display the object to which a visual effect of gradual contraction is applied in the dummy area, in response to the gradual contraction of the exposed area. For example, the processor 120 may control the display module 160 to display the object to which the visual effect is applied in the dummy area of a fixed size corresponding to the second area 223, and upon elapse of a specified time (e.g., completion of the contraction of the exposed area), to display the contracted screen in the exposed area including the first area 221. For example, when the second area 223 is inserted into the housing and placed in a hidden state, the processor 120 may generate a final recorded image by including (or synthesizing) an image that has recorded the screen of the first area 221 and the dummy area of the recorded image corresponding to the hidden second area 223, and store the generated final recorded image in the memory 130. The processor 120 may generate the object to which the visual effect is applied, based on at least one content included in the screen (e.g., the first screen) of the first area 221 and/or another content displayed in the second area 223 before the sliding-in operation, and may be generated by applying the visual effect. The object to which the visual effect is applied may include, for example, at least one of an animation, a preview image, a still image, a dynamic image, a thumbnail, or a graphic. The visual effect may include at least one of, for example, a sharpness (sharpen, blur, or dim) effect, a brightness/contrast effect, a fade in/out effect, a black in/out effect, a disappearing effect, an appearing effect, a transparency effect, a decorative effect, or a cue.

According to an embodiment, the processor 120 may differently generate an object to which a visual effect is applied according to the type of at least one content displayed in an exposed area. The processor 120 may differently generate an object to which a visual effect is applied according to a change in the display position of the first screen 511.

According to an embodiment, the processor 120 may store information about a screen size change of the display 120 during recording, together with a recorded image. The stored information about the screen size change may be used to reproduce the recorded image. For example, a screen ratio may be changed in response to the change of the screen size of the display 120. The processor 120 may record the screen of the display 120 based on the reference screen size and a reference screen ratio.

According to an embodiment, the processor 120 may reproduce the stored final recorded image, and display the reproduced image on the display 120. When a current screen size of the display 220 is equal to the size of the stored recorded image, the processor 120 may reproduce the recorded image, while maintaining the current screen size and the size of the recorded image. When the current screen size of the display 120 is different from the size of the recorded image, the image may be displayed such that the center of the image is located in the middle of the current screen of the display 120, or the recorded image may be displayed scaled to correspond to the current screen size. The processor 120 may detect a change in the screen size of the display 220 through at least one sensor in the sensor module 176 during the image reproduction. The processor 120 may reproduce and display the recorded image based on the changed screen size of the display 220 and the size of the recorded image. When the size of the area corresponding to the screen including at least one content is changed in the recorded image, the recorded image may be displayed so that the size change of the area corresponding to the screen is recognizable while the screen size of the display 220 is fixed. The processor 120 may reproduce the recorded image including the screen image and the object to which the visual effect is applied, included in the dummy area.

In an embodiment, a "screen" may be understood as a physical screen of the electronic device 100 or the display 120 or a virtual screen displayed through the physical screen. A "screen size" may be understood as a size-related property of a screen. For example, the screen size may be at least one of a screen width (horizontal), a screen height (vertical), a screen width and height, or a screen ratio (aspect ratio). The "size of an image (or an image frame)" may be understood as a size-related property of an image (or an image frame). For example, the size of the image may be at least one of an image width (horizontal), an image height (vertical), the width and height of the image, or an image ratio (aspect ratio). A change in the size (e.g., width and height) of a screen or image may be linked to a change in the ratio of the screen or image. The ratio of the screen or image may be changed depending on the size of the screen or image. For example, when the size of the screen is changed by screen extension or contraction, the ratio (e.g., aspect ratio) of the screen may be changed to correspond to the size of the screen. The size of an image recording the screen may be changed according to a change in the size of the screen. The ratio of the image may be changed in response to the change in the size of the image.

For example, the electronic device 101 may have the same or similar mechanical structure as the electronic device 101 of FIGS. 2A and 2B or the electronic device 101 of FIGS. 3A and 3B, and the structures illustrated in FIGS. 2A, 2B, 3A, and FIG. 3B are for illustrative purposes only, not limiting the scope of the embodiments. An embodiment is possible by modifying, changing, applying, and extending the structures within the scope of the disclosure including a display having a flexible structure (e.g., the display 220 of FIG. 1). For example, an electronic device according to an embodiment may include any one of a horizontally slidable electronic device, a vertical slidable electronic device, a multi-axis slidable electronic device that may slide in both directions (e.g., horizontal or vertical) about multiple axes, and a rollable electronic device in which substantially the entirety of the display (e.g., 90% or more of the total area) slides in one direction to roll on a rotation body in a housing or is withdrawn to be unfolded outside the housing.

According to an example embodiment, an electronic device (e.g., the electronic device 101 of FIGS. 1, 2A, 2B, 3A, 3B, 4, 5A, 5B, and 5C) may include: a memory (e.g., the memory 130 of FIG. 1), a display module (e.g., the display module 160 of FIG. 1) including a flexible display, and at least one processor (e.g., the processor 120 of FIG. 1) electrically coupled to the memory and the display module. The at least one processor may be configured to: record a screen of the display displayed in a visible area of the display in a reference screen size, based on a screen size of the visible area being changed by extension or contraction of the visible area of the display during the recording, control the display module to display an object to which a visual effect related to at least one content displayed on the screen is applied, in part of the visible area corresponding to the changed size, and in response to completion of the extension or contraction of the exposed area of the display during the recording, control the display module to display an extended or contracted screen in an extended visible area or a contracted visible area.

According to an example embodiment, the reference screen size may be a screen size of a maximum visible area based on maximum extension of the display.

According to an example embodiment, the at least one processor may be configured to: based on the absence of a change in the screen size based on the extension or contraction of the visible area of the display from a recording start time to a recording end time, store a recorded image recorded from the recording start time to the recording end time in an output size corresponding to the screen size of the visible area.

According to an example embodiment, the at least one processor may be configured to: based on the presence of a change in a size of the visible area from the recording start time to the recording end time, store the recorded image recorded from the recording start time to the recording end time in the reference screen size.

According to an example embodiment, the at least one processor may be configured to: based on the visible area of the display being extended during the screen recording, control the display module to extend the screen in response to the extension of the visible area, and control the display module to display the object to which the visual effect is applied in the part of the visible area, while making the object larger in response to the extension of the visible area. The extended screen may include a first screen including the at least one content or a second screen including the first screen and another content.

According to an example embodiment, the at least one processor may be configured to: based on the visible area of the display being contracted during the screen recording, control the display module to contract the screen in response to the contraction of the visible area, and control the display module to display the object to which the visual effect is applied in the part of the visible area, while making the object smaller in response to the contraction of the visible area.

According to an example embodiment, the electronic device may further include a sensor module including at least one sensor electrically coupled to the at least one processor, and the at least one processor may be configured to: based on the sensor module detecting that a size of the visible area is equal to or greater than the reference screen size during the screen recording, obtain a first partial recorded image of the screen displayed in the visible area, based on the sensor module detecting that the size of the visible area is less than the reference screen size during the screen recording, identify contraction of the visible area based on a first direction, and generate the object to which the visual effect is applied, based on at least one content included in the screen, obtain a second partial recorded image of the contracted screen and the object to which the visual effect is applied, and upon completion of the screen recording, store a final recorded image including the first partial recorded image and the second partial recorded image in the memory.

According to an example embodiment, the electronic device may further include: a sensor module including at least one sensor electrically coupled to the at least one processor, and the at least one processor may be configured to: based on the sensor module detecting that a size of the visible area is equal to or greater than a size of a first screen and less than the reference screen size during the screen recording, identify extension of the visible area based on a second direction, generate an object to which a visual effect related to at least one content included in the screen is applied, and obtain a third recorded image of the extended screen and the object to which the visual effect is applied in the extended visible area, based on the sensor module detecting that the size of the visible area is equal to or greater than the reference screen size during the screen recording, obtain a fourth recoded image of the extended screen displayed in the extended visible area, and upon completion of the screen recording, store a final recorded image including the third recorded image and the fourth recorded image in the memory.

According to an example embodiment, the at least one processor may be configured to, based on the contraction of the visible area of the display being completed during the recording, store a final recorded image by synthesizing the object to which the visual effect is applied in a dummy area in a recorded image of a screen displayed in the contracted visible area, in the memory.

According to an example embodiment, the object to which the visual effect is applied may be generated based on the at least one content displayed on the screen or another content configured in a hidden area, and a different visual effect is applied according to a displayed position and characteristic of a first screen including the at least one content.

According to an example embodiment, the at least one processor may be configured to: based on the display being in a contracted state at a recording start time, record the screen in both the reference screen size and a screen size of the contracted state, based on the absence of a change in the screen size of the visible area from the recording start time to a recording end time, store a first recorded image recorded in the screen size of the contracted state at the recording start time and until the recording end time and delete a second recorded image recorded in the reference screen size at the recording start time and until the recording end time, and based on the screen size of the visible area being increased during the recording, discontinue the recording in the screen size of the contracted state and store the second recorded image recorded in the reference screen size at the recording start time and until the recording end time.

According to an example embodiment, the at least one processor may be configured to: based on the display being in a contracted state at a recording start time, record the screen in a screen size of the contracted state without recording in the reference screen size, based on the absence of a change in the screen size of the visible area from the recording start time to a recording end time, store a first recorded image recorded in the screen size of the contracted state at the recording start time and until the recording end time, and based on the screen size of the visible area being changed during the recording, store the first recorded image recorded in the screen size of the contracted state from the recording start time, record the screen in the reference screen size instead of the screen size of the contracted state until the recording end time or a next change time of the screen size, and store a second recorded image recorded in the reference screen size.

Figure 6:
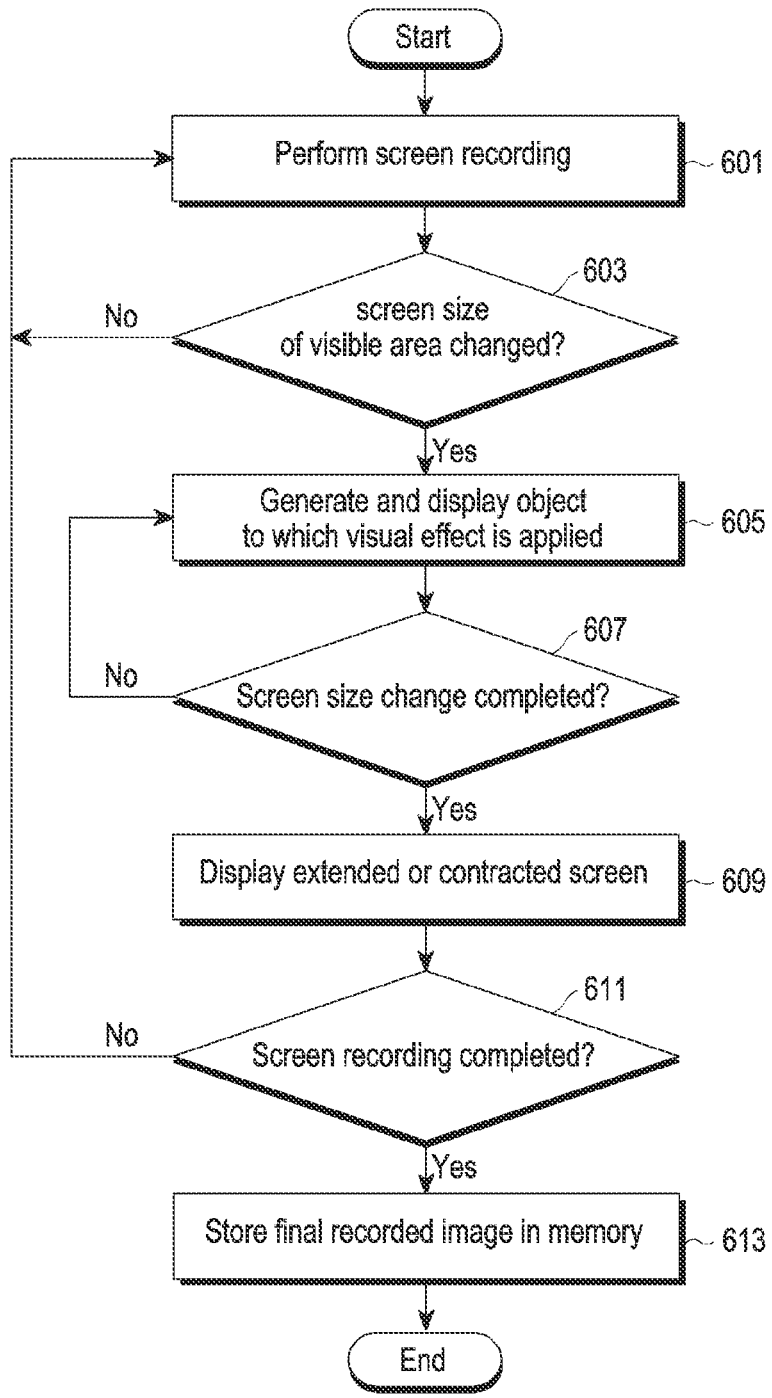
FIG. 6 is a flowchart illustrating an example method of operating an electronic device according to an embodiment.

FIG. 6 is a flowchart illustrating an example method of operating an electronic device according to an embodiment, and FIGS. 7A, 7B, 7C, 7D and 7E are diagrams illustrating examples of screen recording in an electronic device according to an embodiment.

Referring to FIG. 6, an electronic device (e.g., the electronic device 101 of FIGS. 1, 2A, 2B, 3A, and 3B) according to an embodiment may perform screen recording to record a screen displayed in an exposed area of a display (e.g., the display 220 of FIGS. 2A and 2B or the display 320 of FIGS. 3A and 3B) in response to a screen recording request in operation 601. The electronic device may store a screen image that is a recording of a screen displayed in the exposed (e.g., visible) area in memory (e.g., the memory 130 of FIG. 1). The electronic device may record the screen displayed in the exposed area of the display in a reference screen size. The reference screen size may be a screen size of a maximum exposed area based on maximum extension of the display. When screen recording starts, the electronic device may identify a screen recording start time, a screen size of the display, or a state (e.g., the sliding-in state or the sliding-out state) of the display. When the display is in the sliding-in state (e.g., contracted state) at the recording start time, the electronic device may identify a contracted exposed area (e.g., the first area 221 of FIGS. 2A and 2B) and a hidden area (e.g., the second area 223 of FIG. 2B). The electronic device may record a screen including at least one content displayed in the contracted exposed area, together with a dummy area corresponding to an area (e.g., the hidden area) corresponding to a difference between the reference screen size and the screen size of the exposed area. The dummy area may correspond to the difference between the screen size of the exposed area and the reference screen size, and may be a blank area in which content is not displayed or an area processed in black in the obtained recorded image. When the display is in the sliding-out state (e.g., extended state) at the recording start time, the electronic device may identify an extended exposed area (e.g., the second area 223 of FIG. 2B). The electronic device may record a screen including at least one content displayed in the extended exposed area.

In operation 603, the electronic device may use at least one sensor (e.g., the sensor module 140) to identify whether the screen size of the exposed (e.g., visible) area of the display has been changed due to extension or contraction of the exposed (e.g., visible) area of the display during the screen recording. When the screen size of the exposed area has been changed as a result of the identification, the electronic device may perform operation 605, and when the screen size of the exposed area has not been changed, the electronic device may perform operation 601.

Figure 7A:
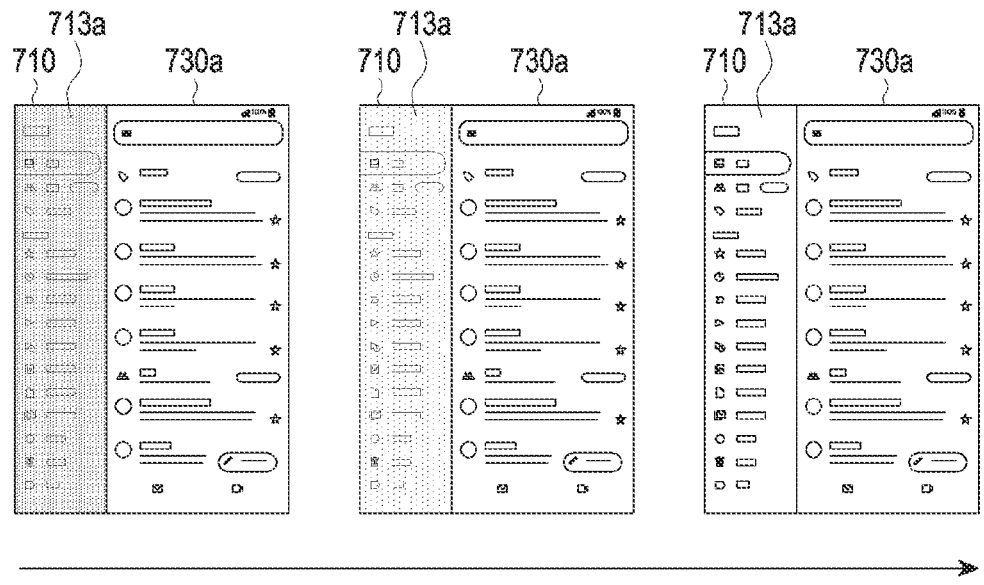
FIGS. 7A, 7B, 7C, 7D and 7E are diagrams illustrating examples of screen recording in an electronic device according to an embodiment.
Figure 7B:
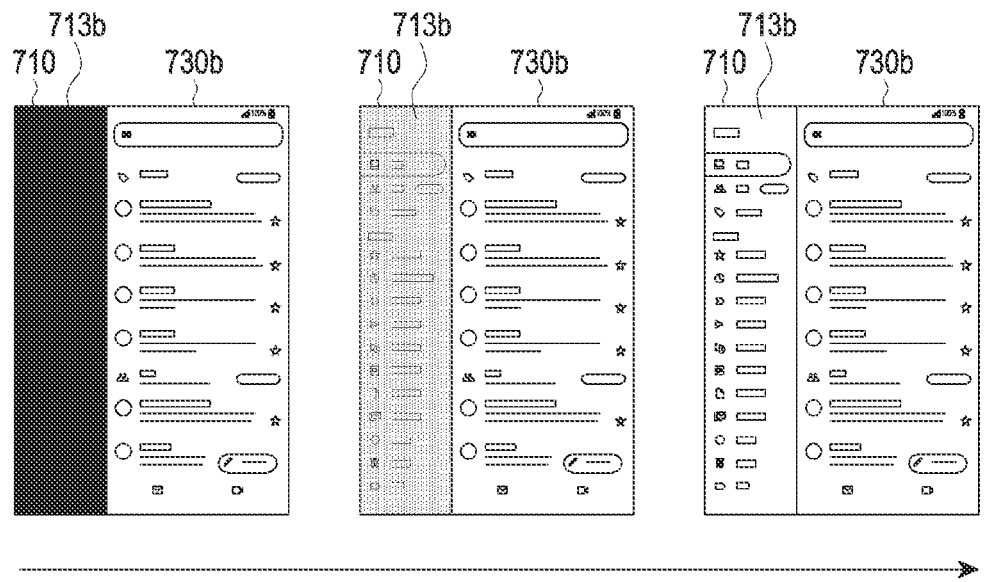
Figure 7C:
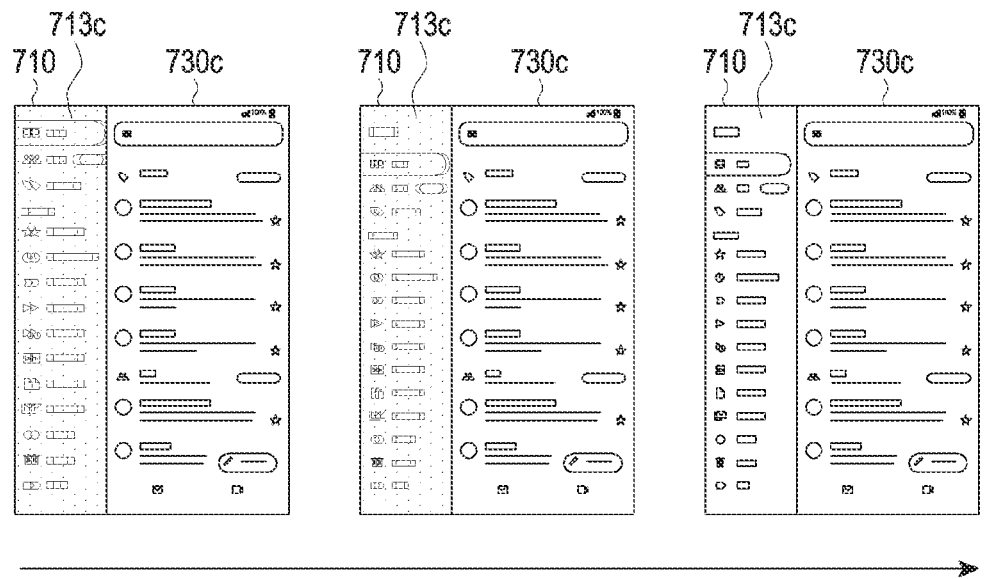
Figure 7D:
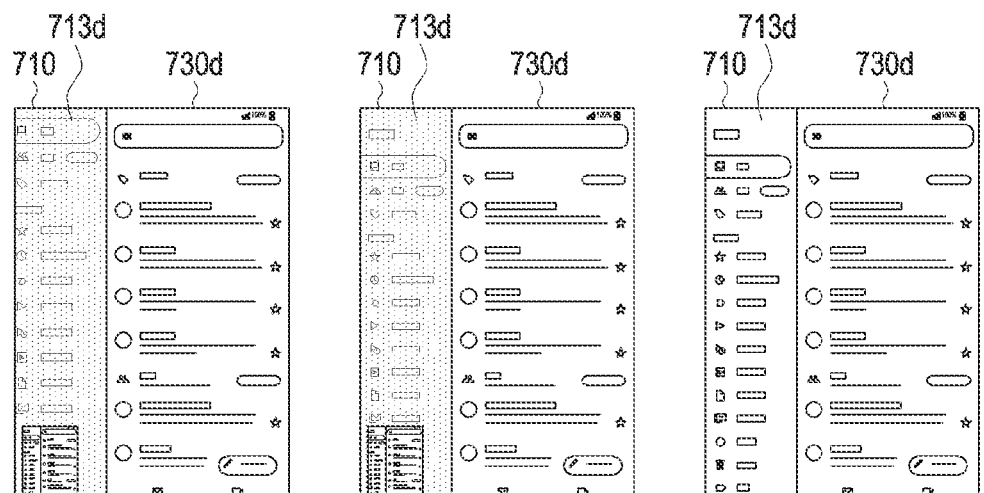
Figure 7E:
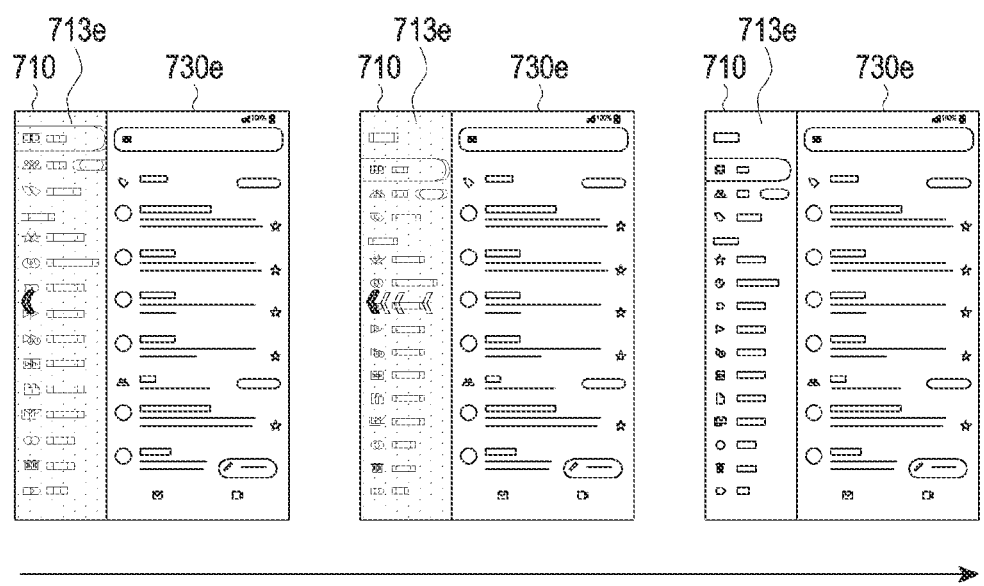

In operation 605, the electronic device may generate an object to which a visual effect (e.g., at least one of an animation, a preview image, a still image, a dynamic image, a thumbnail, or a graphic) related to at least one content included in the screen of the exposed area is applied, based on a change in the screen size of the exposed area due to extension or contraction of the exposed area of the display during the screen recording. The electronic device may identify the dummy area and display the object to which the visual effect is applied in at least part of the dummy area corresponding to the changed size. The visual effect may include at least one of, for example, a sharpness (sharpen, blur or dim) effect, a brightness/contrast effect, a fade in/out effect, a black in/out effect, a disappearing effect, an appearing effect, a transparency effect, a decorative effect, a cue, or the like. The electronic device may store the recorded image in the memory by including the object to which the visual effect is applied in the dummy area of the recorded image, and display the object to which the visual effect is applied in part (e.g., part of the second area) of the exposed area of the display, corresponding to the dummy area. For example, as illustrated in FIG. 7A, the electronic device may display and store a recorded image 730a including an object 713a to which the fade in/out effect is applied in a dummy area 710. For example, as illustrated in FIG. 7B, the electronic device may display and store a recorded image 730b including an object 713b to which the black in/out effect is applied in the dummy area 710. For example, as illustrated in FIG. 7C, the electronic device may display and store a recorded image 730c including an object 713c to which a sharpen, blur, or dim effect is applied in the dummy area 710. For example, as illustrated in FIG. 7D, the electronic device may display and store a recorded image 730d including an object 713d to which the preview image effect is applied in the dummy area 710. For example, as illustrated in FIG. 7E, the electronic device may display and store a recorded image 730e including an object 713e to which the cue effect is applied in the dummy area 710. When the screen size of the exposed area is changed due to the extension or contraction of the exposed area of the display, the electronic device may display the object to which the visual effect is applied in an area (e.g., part of the second area) that is gradually (e.g., at a specified rate) exposed or hidden by the extension or contraction, while gradually exposing or hiding the object.

In operation 607, the electronic device may identify whether the screen size change according to the extension or contraction of the exposed area of the display has been completed during the screen recording. As a result of the identification, when the screen size change has been completed, the electronic device performs operation 609. When the screen size change is not completed, the electronic device may continuously display the object to which the visual effect is applied in operation 605.

In operation 609, the electronic device may display an extended or contracted screen on the extended or contracted exposed (e.g., visible) area in response to the extension or contraction of the exposed area.

In operation 611, the electronic device may identify whether the screen recording has been completed. As a result of the identification, when the screen recording has been completed, the electronic device may perform operation 613, otherwise, the electronic device may continue to perform the screen recording operation in operation 601.

In operation 613, the electronic device may store a final recorded image including the recorded screen image in the memory based on whether the screen size of the exposed area has been changed. Upon completion of the screen recording, the electronic device may identify a screen recording end time, and identify whether the screen size of the exposed area of the display has been changed from a recording start time to the recording end time. When there is a change in the screen size of the exposed area of the display from the recording start time to the recording end time, the electronic device may store, in the memory, a final recorded image including the screen image being a recording of the screen displayed on the exposed area and the object to which the visual effect is applied. When the screen size of the exposed area of the display is fixed without a change in the screen size of the exposed area of the display from the recording start time to the recording end time, the electronic device may store the screen image being a recording of the screen displayed on the exposed area as a recorded image in the memory. For example, when the screen size is fixed without a change in the screen size of the exposed area of the display from the recording start time to the recording end time, and the display state is the sliding-in state, the electronic device may crop the dummy area from the screen image recorded in the reference screen size, and store a screen image corresponding to the screen size of the exposed area as a recorded image. For example, when the screen size is fixed without a change in the screen size of the exposed area of the display from the recording start time to the recording end time, and the display state is the sliding-out state, the exposed area corresponds to the reference screen size. Accordingly, the recorded screen image may be stored as a recorded image.

Figure 8:
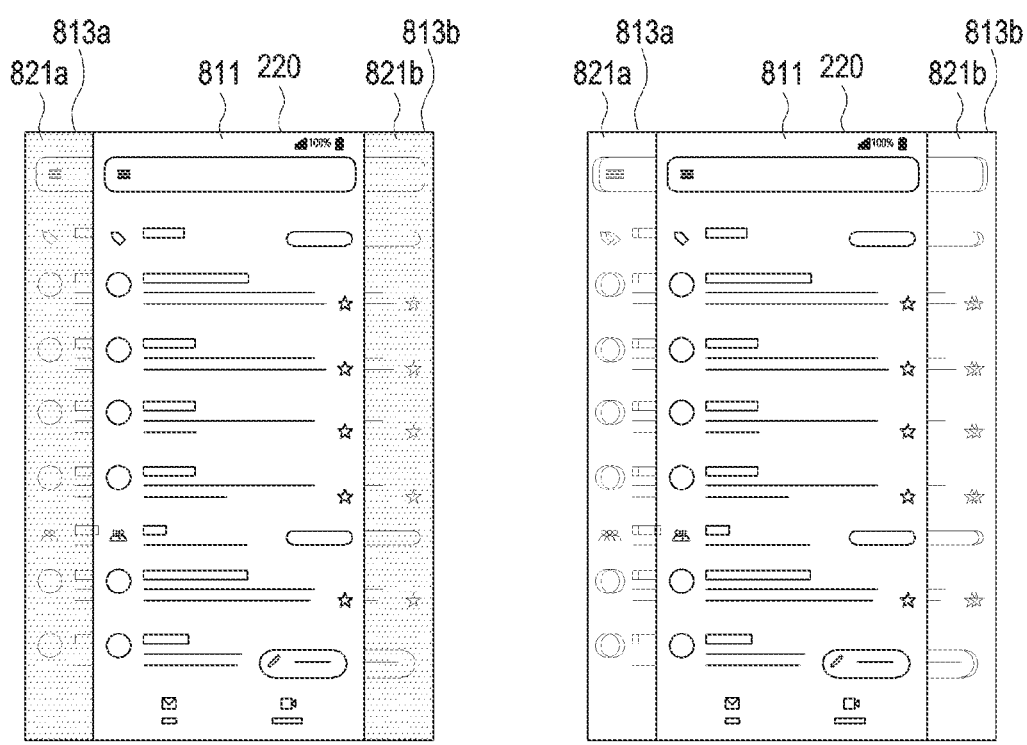
FIG. 8 is a diagram illustrating an example of screen recording in an electronic device according to an embodiment.
Figure 9A:
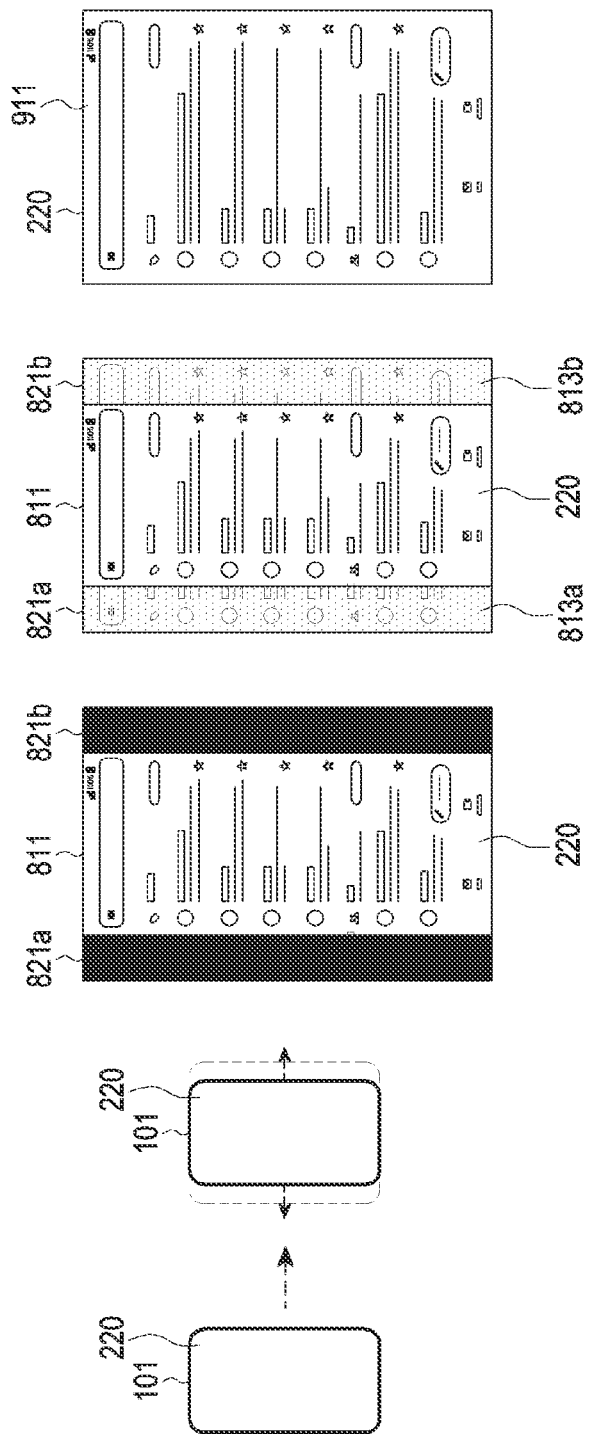
FIGS. 9A and 9B are diagrams illustrating examples of screen recording in an electronic device according to an embodiment.
Figure 9B:
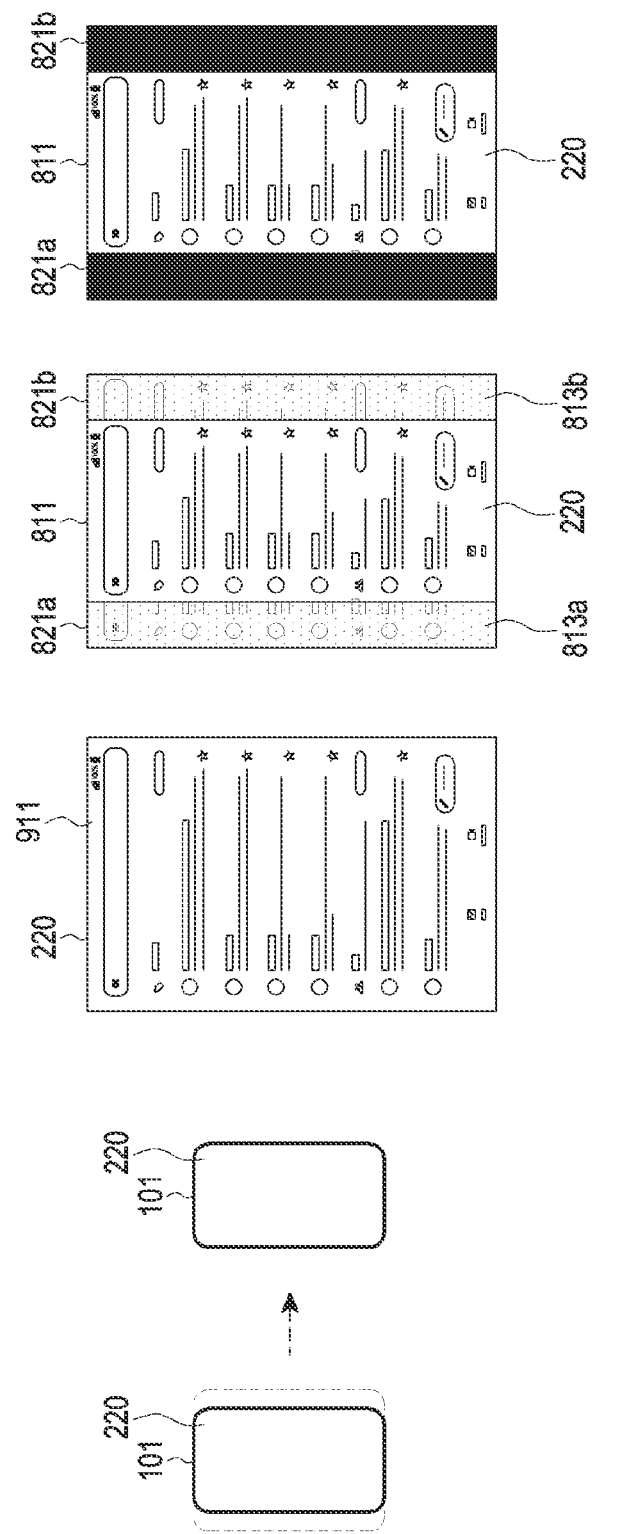

FIG. 8 is a diagram illustrating an example of screen recording of an electronic device according to various embodiments, and FIGS. 9A and 9B are diagrams illustrating an example of screen recording of an electronic device according to various embodiments.

The electronic device according to an embodiment may differently display an object to which a visual effect is applied in part (e.g., a part of the second area) of an exposed (e.g., visible) area, corresponding to a dummy area based on the type of content included in a screen displayed on the exposed area.

Referring to FIG. 8, when performing operation 605 illustrated in FIG. 6, the electronic device 101 according to an embodiment may identify the type of content included in a screen displayed on the exposed (e.g., visible) area, or identify whether a new user interface (UI) has been configured, which is related to content (hereinafter referred to as first content) included in a screen 811 displayed on the display 220 (e.g., the display 220 of FIG. 1) or another content (hereinafter referred to as second content). When the type of the content is content having a fixed screen size irrespective of extension or contraction of the display 220 or a new UI has not been configured, the electronic device 101 may generate objects 813a and 813b to which a visual effect is applied, based on the first content displayed on a current screen, and display the generated objects 813a and 813b in parts 821a and 821b of an extended exposed area corresponding to a dummy area.

Referring to FIG. 9A, the electronic device 101 according to an embodiment may display the screen 811 including the first content in the first area (e.g., the first area 221 of FIGS. 2A and 2B) of the display 220 in the slid-in state (e.g., the contracted state). The electronic device 101 may store a recorded image in a reference screen size by including the dummy area corresponding to a hidden area (e.g., the second area 223 of FIG. 2B), while recording a screen image of the screen 811 displayed in an exposed area.

According to an embodiment, in response to a request for extension of the exposed area of the display 220 during the screen recording, the electronic device 101 may display the screen 811 including the first content at the center of an extended exposed area. The disclosure is not limited thereto, and the electronic device 101 may display the screen 811 by arranging it on a side (a left, right, upper, or lower side). The electronic device 101 may store a recorded image in the reference screen size by including the dummy area corresponding to a hidden area (e.g., the second area 223) while recording the screen image of the screen 811 displayed in the exposed area. The electronic device 101 may designate the remaining area (e.g., left and right areas or upper and lower areas) of the extended exposed area except for the area in which the screen 811 is displayed, as part of the exposed area corresponding to the dummy area, and display the objects 813*a* and 813*b* to which a visual effect is applied in the designated part 821*a* and 821*b* of the exposed area. The electronic device 101 may record a screen image including the screen 811 and the displayed objects 813*a* and 813*b* to which the visual effect is applied, from a time of requesting extension of the exposed area of the display 220 to a time of completion of the extension of the exposed area or during a specified time. For example, the electronic device 101 may store a recorded image by synthesizing the objects 813*a* and 813*b* to which the visual effect is applied in the dummy area corresponding to the remaining area except for the screen 811 in an image recorded in the reference screen size, without displaying the objects 813*a* and 813*b* to which the visual effect is applied in the designated part 821*a* and 821*b* of the exposed area, from the time of requesting extension of the exposed area of the display 220 to the time of completion of the extension of the exposed area or during the specified time.

According to an embodiment, when the extension of the exposed area is completed by the sliding-out operation or the specified time elapses, the electronic device 101 may display an extended screen 911 including the first content in a size corresponding to the screen size of an extended exposed area of the display 220. The electronic device 101 may store a screen image being a recording of the extended screen 911 displayed in the extended exposed area as a recorded image. When the screen recording is completed, the electronic device 101 may store recorded images recorded from a recording start time to a recording end time as a final recorded image.

Referring to FIG. 9B, according to an embodiment, the electronic device 101 may display the screen 911 in a size corresponding to the screen size of an extended exposed area in the sliding-out state (e.g., the extended state) of the display 220. The electronic device 101 may store a screen image being a recording of the screen 911 displayed in the extended exposed area as a recorded image.

According to an embodiment, the electronic device 101 may contract the current extended screen 911 including a first content and display the contracted screen 811 at the center of the extended exposed area, in response to a request for contraction of the exposed area of the display 220. The disclosure is not limited thereto, and the electronic device 101 may display the screen 811 in a side (the left, right, upper, or lower side). The electronic device 101 may designate the remaining area (e.g., the left and right areas or the upper and lower areas) of the extended exposed area except for the area in which the contracted screen 811 is displayed, as the part 821*a* and 821*b* of the exposed area corresponding to the dummy area, and display the objects 813*a* and 813*b* to which a visual effect is applied in the designated part 821*a* and 821*b* of the exposed area. For example, the electronic device 101 may generate a final recorded image by synthesizing the objects 813*a* and 813*b* to which the visual effect is applied in the dummy area corresponding to the remaining area except for the screen 811 in an image recorded in a reference screen size, without displaying the objects 813*a* and 813*b* to which the visual effect is applied in the designated part 821*a* and 821*b* of the exposed area, from a time of requesting contraction of the exposed area to a time of completion of the contraction of the exposed area or during a specified time.

According to an embodiment, when the contraction of the exposed area is completed by the sliding-in operation or the specified time elapses, the electronic device 101 may display the contracted screen 811 including the first content in a size corresponding to the screen size of a contracted exposed area of the display 220. The electronic device 101 may store a recorded image in the reference screen size by including the dummy area corresponding to a hidden area (e.g., the second area 223) while recording a screen image of the contracted screen 811 displayed in the exposed area. When the screen recording is completed, the electronic device 101 may store recorded images recorded from a recording start time to a recording end time as a final recorded image.

Figure 10A:
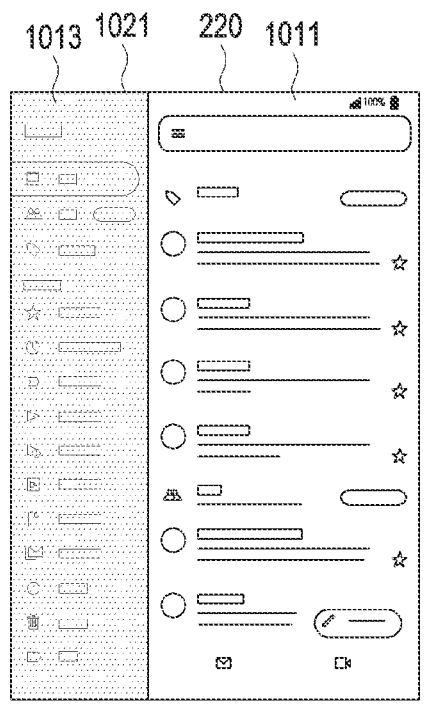
FIGS. 10A and 10B are diagrams illustrating an example of screen recording in an electronic device according to an embodiment.
Figure 10B:
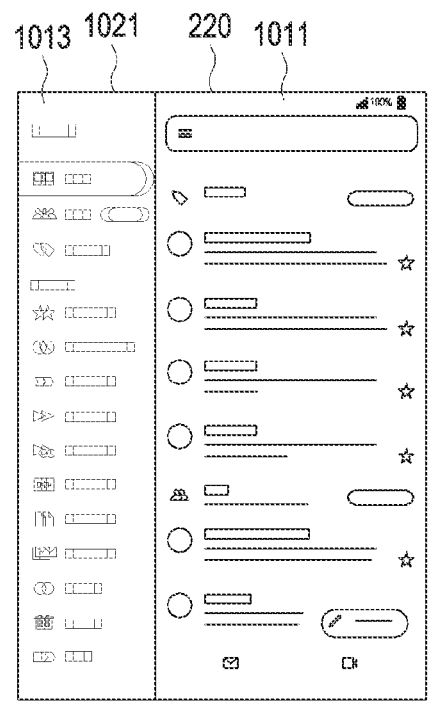
Figure 11A:
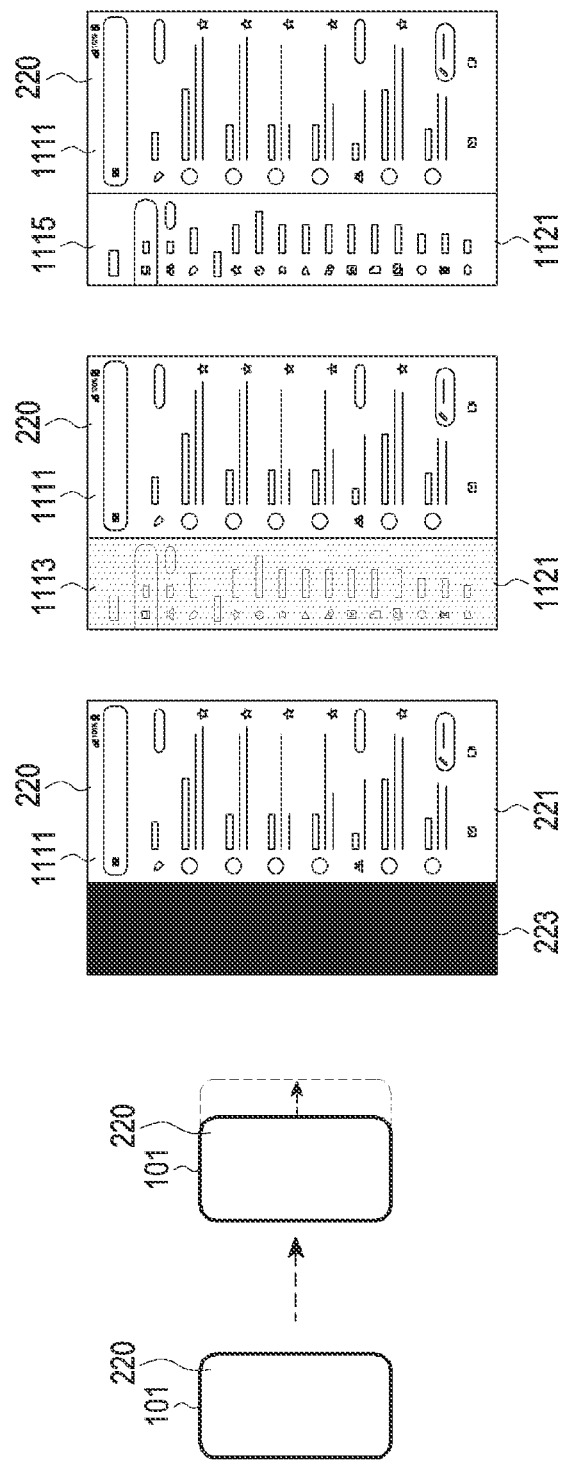
FIGS. 11A and 11B are diagrams illustrating examples of screen recording in an electronic device according to an embodiment.
Figure 11B:
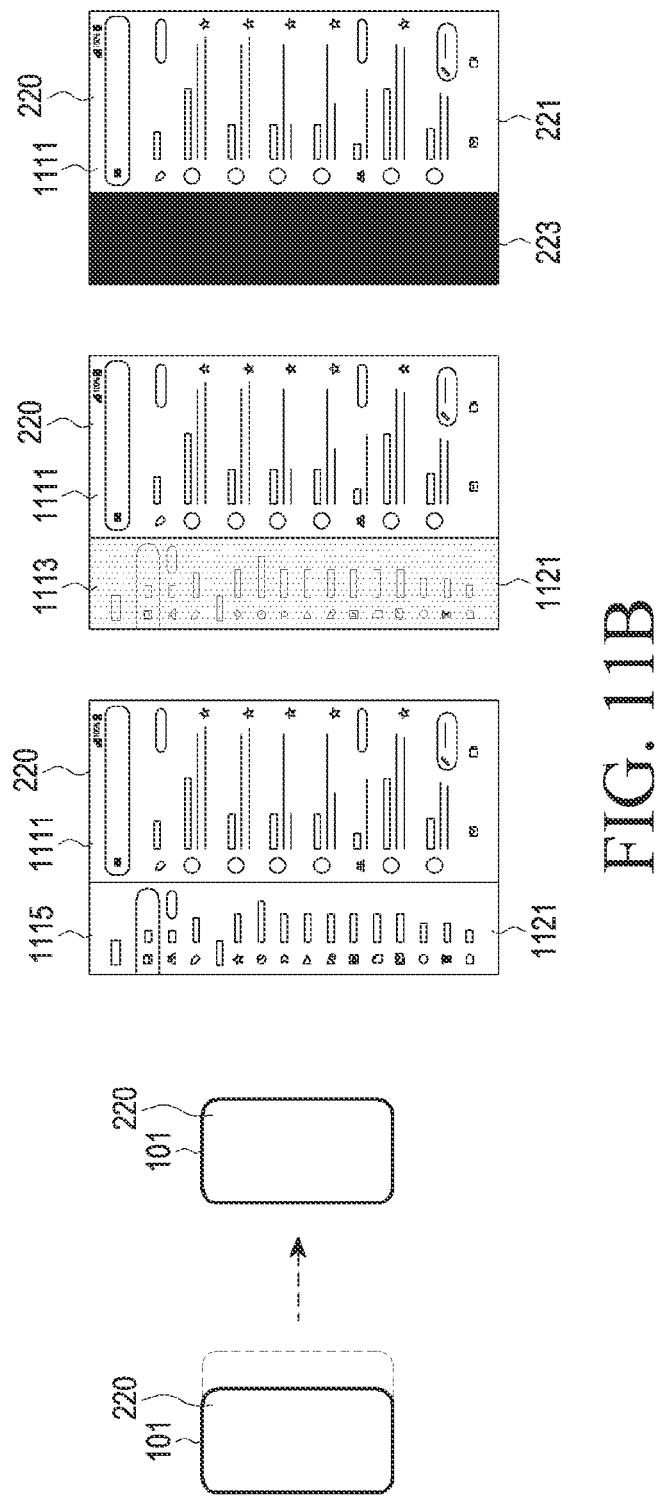

FIGS. 10A and 10B are diagrams illustrating an example of screen recording of an electronic device according to an embodiment, and FIGS. 11A and 11B are diagrams illustrating examples of screen recording of an electronic device according to an embodiment.

Referring to FIGS. 10A and 10B, when performing operation 605 illustrated in FIG. 6, the electronic device 101 according to an embodiment may identify the type of content included in a screen displayed on an exposed area, or identify whether a new UI has been configured, which is related to content (hereinafter referred to as first content) included in a first screen 1011 displayed on the display 220 (e.g., the display 220 of FIG. 1) or another content (hereinafter referred to as second content). When a new UI has been configured, the electronic device 101 may generate an objects 1013 to which a visual effect is applied, based on the first content displayed on the first screen 1011 and/or another content (e.g., the second content) included in the new UI, and display the generated object 1013 to which the visual effect is applied in part 1021 of an extended exposed area corresponding to a dummy area of a recorded image. While the part 1021 of the exposed area in which the object 1013 to which the visual effect is applied has been described in the context of an area corresponding to the second area (e.g., the second area 223 of FIG. 2B) by way of example, the disclosure is not limited thereto, and the part 1021 may be changed to a partial area of the first area (e.g., the first area 221 of FIGS. 2A and 2B) or a partial area between the first area and the second area according to the type of the content or movement of the first screen 1011.

Referring to FIG. 11A, the electronic device 101 according to an embodiment may display the first screen 1011 including the first content in the first area 221 of the display 220 in the slid-in state (e.g., the contracted state) of the display 220. The electronic device 101 may store a recorded image in a reference screen size by including the dummy area corresponding to a hidden area (e.g., the second area 223 of FIG. 2B), while recording a screen image of the first screen 1011 displayed in the exposed area.

According to an embodiment, in response to a request for extension of the exposed area of the display 220 during the screen recording, the electronic device 101 may move the first screen 1011 including the first content in the extension direction and display the moved first screen 1011. The disclosure is not limited thereto, and the electronic device 101 may display the first screen 1011 by disposing it on a side (a left, right, upper, or lower side). The electronic device 101 may designate the remaining area (e.g., left and right areas or upper and lower areas) of the extended exposed area except for the area in which the first screen 1011 is displayed, as part 1121 of the exposed area corresponding to the dummy area, and display an object 1113 to which a visual effect is applied in the designated part 1121 of the exposed area. The electronic device 101 may record a screen image including the first screen 1011 and the displayed object 1113 to which the visual effect is applied, from a time of requesting extension of the exposed area of the display 220 to a time of completion of the extension of the exposed area or during a specified time. For example, the electronic device 101 may store a recorded image by synthesizing the object 1113 to which the visual effect is applied in the dummy area corresponding to the remaining area except for the first screen 1111 in an image recorded in the reference screen size, without displaying the object 1113 to which the visual effect is applied in the designated part 1121 of the exposed area, from the time of requesting extension of the exposed area of the display 220 to the time of completion of the extension of the exposed area or during the specified time.

According to an embodiment, when the extension of the exposed area is completed by the sliding-out operation or the specified time elapses, the electronic device 101 may display the first screen 1111 and a second screen 1115 in a size corresponding to the screen size of an extended exposed area of the display 220. The electronic device 101 may store a screen image being a recording of the first screen 1111 and the second screen 1115 displayed in the extended exposed area as a recorded image. When the screen recording is completed, the electronic device 101 may store recorded images recorded from a recording start time to a recording end time as a final recorded image.

Referring to FIG. 11B, according to an embodiment, the electronic device 101 may display the first screen 1111 and the second screen 1115 in a size corresponding to the screen size of an extended exposed area in the sliding-out state (e.g., the extended state) of the display 220. The electronic device 101 may store a screen image being a recording of the first screen 1111 and the second screen 1115 displayed in the extended exposed area as a recorded image.

According to an embodiment, the electronic device 101 may display the first screen 1111 by moving the first screen 1111 in the contraction direction in response to a request for contraction of the exposed area of the display 220. The disclosure is not limited thereto, and the electronic device 101 may display the first screen 1111 by disposing the first screen 1111 on a side (e.g., a left, right, upper, or lower side). The electronic device 101 may designate the remaining area (e.g., the left and right areas or the upper and lower areas) of the extended exposed area except for the area in which the first screen 1111 is displayed, as part 1121 of the exposed area corresponding to the dummy area, and display the object 1113 to which a visual effect is applied in the designated part 1121 of the exposed area. For example, the electronic device 101 may generate a final recorded image by synthesizing the object 1113 to which the visual effect is applied in the dummy area corresponding to the remaining area except for the first screen 1111 in an image recorded in a reference screen size, without displaying the object 1113 to which the visual effect is applied in the designated part 1121 of the exposed area, from a time of requesting contraction of the exposed area to a time of completion of the contraction of the exposed area or during a specified time.

According to an embodiment, when the contraction of the exposed area is completed by the sliding-in operation or the specified time elapses, the electronic device 101 may display the first screen 1111 including the first content in a size corresponding to the screen size of a contracted exposed area of the display 220. The electronic device 101 may store a recorded image in the reference screen size by including the dummy area corresponding to a hidden area (e.g., the second area 223) while recording a screen image of the first screen 1111 displayed in the exposed area. When the screen recording is completed, the electronic device 101 may store recorded images recorded from a recording start time to a recording end time as a final recorded image.

FIGS. 12A, 12B, 12C, 12D, 12E and 12F are diagrams illustrating an example of screen recording in an electronic device according to an embodiment.

Referring to FIGS. 12A, 12B, 12C, 12D, 12E and 12F, the electronic device 101 according to an embodiment may display a first screen 1211 and a second screen 1215 in a size corresponding to a screen size of an extended exposed area in the sliding-out state, as illustrated in FIG. 12A. The electronic device 101 may record the first screen 1211 and the second screen 1215 displayed in the exposed area of the display 220. In response to a request for contraction of the exposed area of the display 220 during the screen recording, the electronic device 101 may generate an object 1223 to which a first visual effect is applied, based on content (e.g., first content) included in the first screen 1211 and content (e.g., second content) included in the second screen 1215. For example, as illustrated in FIG. 12B, the electronic device 101 may generate the object 1213 to which the visual effect is applied, based on the content (e.g., the second content) included in the second screen 1215. The visual effect may include at least one of, for example, a sharpness (sharpen, blur, or dim) effect, a brightness/contrast effect, a fade in/out effect, a black in/out effect, a disappearing effect, an appearing effect, a transparency effect, a decorative effect, or a cue.

According to an embodiment, the electronic device 101 may display the first screen 1211 by gradually moving the first screen 1211 in the contraction direction in response to the request for contraction of the exposed area of the display 220, as illustrated in FIG. 12B. The electronic device 101 may designate the remaining area of the exposed area except for an area in which the first screen 1211 is displayed as part 1221 of the exposed area corresponding to a dummy area, and display the first object 1213 to which the visual effect is applied in the designated part 1221 of the exposed area. For example, as illustrated in FIG. 12B, the electronic device 101 may display the first object 1213 to which the visual effect is gradually applied during the contraction of the exposed area.

According to an embodiment, upon completion of the contraction of the exposed area of the display 220, the electronic device 101 may record the first screen 1211 displayed in a contracted exposed area, and record the dummy area corresponding to the part 1223 of a hidden area as a blank area or an area processed in black, thereby obtaining a recorded image in a reference screen size, as illustrated in FIG. 12C. As illustrated in FIG. 12D, the electronic device 101 may generate the second object 1215 to which a visual effect is applied, based on content included in the second screen 1215. The second object 1215 to which the visual effect is applied may be generated as a preview image. For example, the preview image may be an image corresponding to the second screen 1215 displayed on an extended exposed area at a time of requesting switching to sliding-out. In another example, the preview image may be an image in which update information about the second content is reflected from a time of completion of switching to sliding-out to a time of completion of the screen recording. Upon completion of the screen recording, the electronic device 101 may store a first recorded image of the first screen 1211 and the second screen 1215 displayed in the exposed area of the display 220 from the screen recording start time to the time of requesting switching to sliding-out, store a second recorded image of the first screen 1211 and the first object 1213 to which the visual effect is applied from the time of requesting switching to sliding-out to a time of switching to sliding out and completing contraction of the exposed area, generate a third recorded image by synthesizing the generated second object 1215 to which the visual effect is applied in a recorded image of the first screen 1211 from a time of completing switching to sliding-out to a screen recoding end time, and store the generated third recorded image in the memory. The electronic device 101 may store a final recorded image 1231 including the first recorded image, the second recorded image, and the third recorded image in the memory.

According to an embodiment, when reproduction of the final recorded image is requested, the electronic device 101 may display the final recorded image 1231 of the reference screen size in the extended exposed area in the extended state (e.g., the sliding-out state) of the display 220, as illustrated in FIG. 12E. When reproduction of the final recorded image is requested, the electronic device 101 may display the final recorded image 1231 contracted in the screen size of the contracted exposed area in the contacted state (e.g., the sliding-in state) of the display 220, as illustrated in FIG. 12F.

Figure 13:
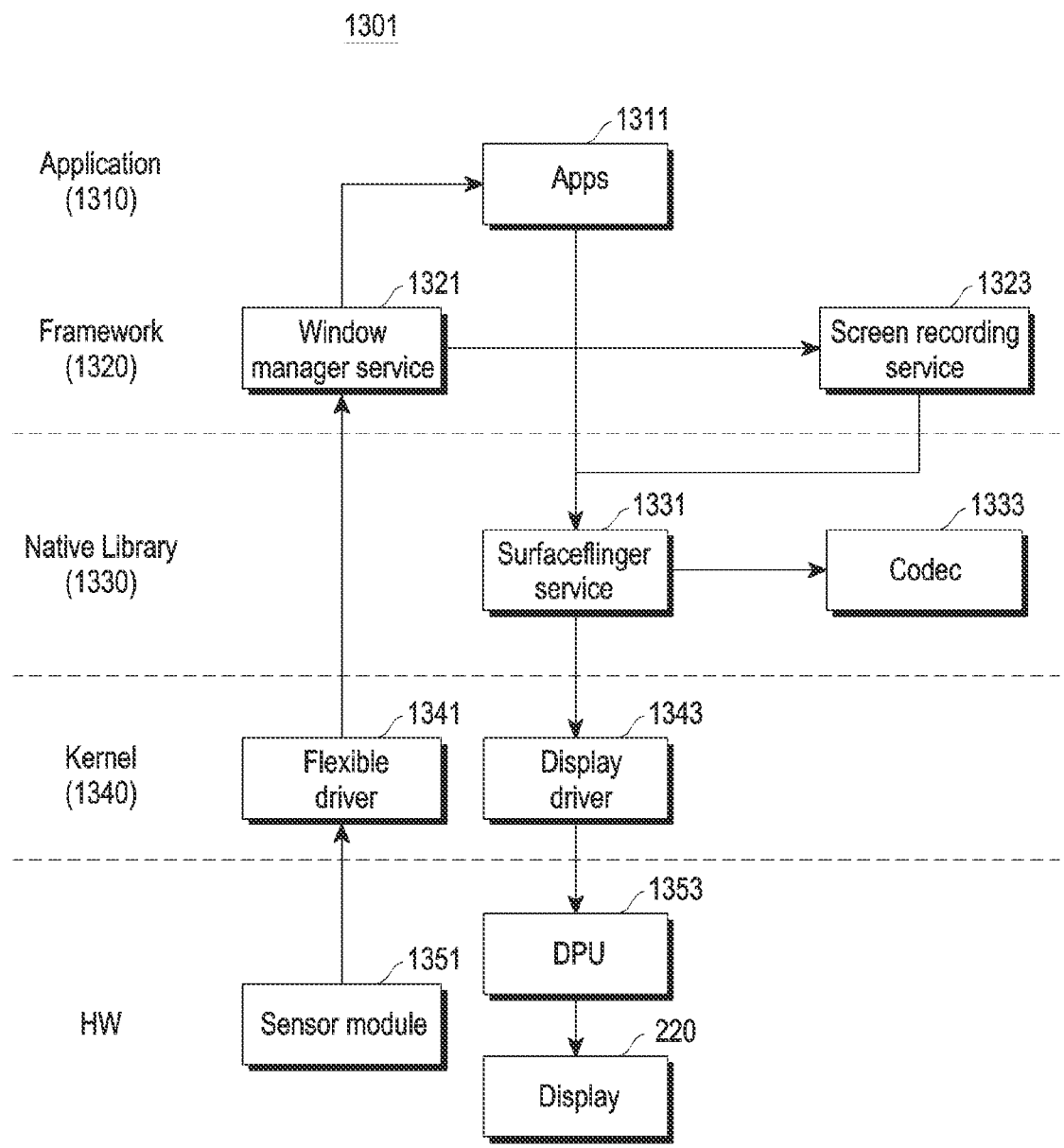
FIG. 13 is a diagram illustrating an example configuration of a software module in an electronic device according to an embodiment.

FIG. 13 is a diagram illustrating an example configuration of a software module in an electronic device according to an embodiment.

Referring to FIG. 13, an electronic device (e.g., the electronic device 101 of FIGS. 1, 2A, 2B, 3A, 3B, 4, 5A, 5B, and 5C) according to an embodiment may implement a software module 1301 (e.g., the program 140 of FIG. 1) for screen recording. Memory (e.g., the memory 130 of FIG. 1) of the electronic device may store instructions to implement the software module 1301 illustrated in FIG. 13. At least one processor (e.g., the processor 120 of FIG. 1) may execute the instructions stored in the memory to implement the software module 1301 illustrated in FIG. 13, and control hardware (HW) associated with the function of the software module 1301. The HW may include a sensor module 1351 (e.g., the sensor module 176 of FIG. 1) including at least one sensor to detect a screen size, a data processing unit (DPU) 1353 (e.g., the processor 120 of FIG. 1), and the display 220 (e.g., the display module 160 of FIG. 1), and further include other HW components illustrated in FIG. 1.

Referring to FIG. 13, the software module 1301 according to an embodiment may be configured to include an application 1310 (e.g., the application 146 of FIG. 1), a framework 1320 (e.g., the middleware 144 of FIG. 1), a native library 1330, and a kernel 1340 (or HAL). At least part of the software module 1301 may be preloaded on the electronic device or downloaded from a server (e.g., the server 108).

According to an embodiment, the application 1310 may be configured to include applications (Apps) 1311 (e.g., a module, a function, a manager, or a program) related to screen recording. The application 1310 may be configured to further include a module (or application) (not shown) for wireless communication with an external electronic device (e.g., the electronic devices 102 and 104 or the server 108 of FIG. 1). According to an embodiment, the application 1310 may include an application received from an external electronic device (e.g., the server 108 or the electronic devices 102 and 104). According to an embodiment, the application 1310 may include a preloaded application or a third party application downloadable from a server.

According to an embodiment, the framework 1320 may be configured to include, but not limited to, for example, a window manager service 1321 and a screen recording service (power controller) 1323, and to further include other services (e.g., a module, a function, a manager, or a program). The framework 1320 may provide a function commonly required by the application 1310 or provide various functions to the application 1310 through an application programming interface (API) (not shown) so that the application 1310 may efficiently use limited system resources inside the electronic device 101. According to an embodiment, the window manager service 1321 may manage and process an operation of displaying at least one content on the display 220 and an operation of recording a screen of the display displayed in an exposed area of the display in a reference screen size. According to an embodiment, the window manager service 1321 may provide a surfaceflinger service 1331 with a buffer and window metadata that the surfaceflinger service 1331 uses to synthesize an exposed area on the display. As the sensor module 1351 detects a change (e.g., extension or contraction) in the screen size of the display 220 during recording, the window manager service 1321 may manage and process an operation of displaying an object to which a visual effect related to at least one content displayed on a screen is applied in part of the exposed area corresponding to the changed size. According to an embodiment, the screen recording service (power controller) 1323 may process an instruction processed by the window manager service 1321. For example, the screen recording service 1323 may process an instruction related to screen recording to store screen-recorded data. According to an embodiment, the framework 1320 may include a module that forms a combination of various functions of the above-described components. The framework 1320 may provide a module specialized for each OS type to provide differentiated functions. The framework 220 may dynamically delete some existing components or add new components.

According to an embodiment, the native library 1330 may include the surfaceflinger service 1331 and a codec 1333. According to an embodiment, the surfaceflinger service 1331 may perform GPU composition (e.g., reflect a changed resolution) for screen recording of the display 220. The surfaceflinger service 1331 may accept a frame buffer, configure the frame buffer, and transmit the frame buffer to the display 220 via a display driver 1343 of the kernel 210. According to an embodiment, the codec 1333 may receive a frame buffer rendered at a current resolution, encode the frame buffer, and store the encoded frame buffer as an image. The encoded image may be stored as one file, and in a method of recording both a contracted state and an extended state, stored as two video files.

According to an embodiment, the kernel 1340 may include, but not limited to, for example, a system resource manager or a device driver, and further include other modules. The system resource manager may control, allocate, or reclaim system resources. The device driver may include, for example, a display driver, a camera driver, a Bluetooth driver, a shared memory driver, a USB driver, a keypad driver, a WIFI driver, an audio driver, or an inter-process communication (IPC) driver. According to an embodiment, the kernel 1340 may be configured to include a flexible driver 1341 and the display driver 1343 as device drivers. According to an embodiment, the flexible driver 1341 may receive information about a screen size change caused by extension or contraction of the display 220 from the sensor module 1351, and transmit the received information about the screen size change to the window manager server 1321. According to an embodiment, the display driver 1343 may transmit the frame buffer configured by the surfaceflinger service 1331 to the display 220 through the DPU 1353.

The components of the software module 1301 according to the embodiment illustrated in FIG. 13 and their names may vary depending on the type of an OS. According to an embodiment, at least part of the software module 1301 may be implemented in software, firmware, hardware, or a combination of at least two of them. At least part of the software module 1301 may be implemented (e.g., executed) by, for example, a processor (e.g., AP). At least part of the software module 1301 may include any one of, for example, a module, a program, a routine, a set of instructions, or a process, for performing at least one function.

Figure 14:
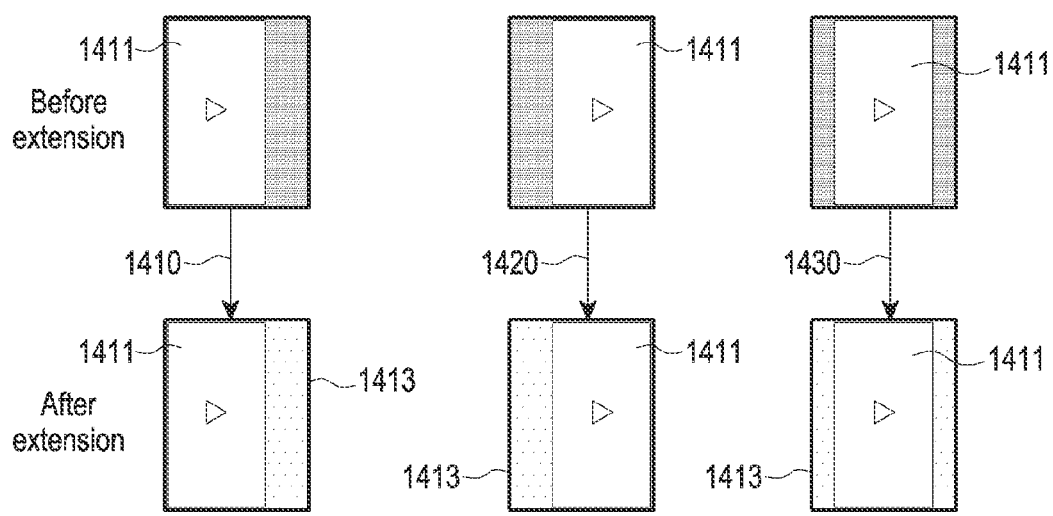
FIG. 14 is a diagram illustrating an example of screen recording in an electronic device according to an embodiment.

FIG. 14 is a diagram illustrating an example of screen recording in an electronic device according to an embodiment.

Referring to FIGS. 13 and 14, according to an embodiment, when starting recording a screen 1411 by the software module 1301, the electronic device 101 (e.g., the electronic device 101 of FIGS. 1, 2A, 2B, 3A, 3B, 4, 5A, 5B, and 5C) may generate an image buffer suitable for a screen size (e.g., a reference screen size) of an extended exposed area by the screen recording service 1323 of the software module 1301. According to an embodiment, the electronic device 101 may relocate the screen 1411 according to an extension direction (e.g., right extension 1410, left extension 1420, or bi-directional extension 1430 in FIG. 4) by the screen recording service 1323. For example, in the case of the bi-directional extension 1430, the electronic device 101 may dispose the screen 1411 at the center of an area 1413 corresponding to the image buffer by the screen recording service 1323. In the case of the right extension 1410, the electronic device 101 may dispose the screen 1411 on the right side of the area 1413 corresponding to the image buffer by the screen recording service 1323. In the case of the left extension 1410, the electronic device 101 may dispose the screen 1411 on the left side of the area 1413 corresponding to the image buffer by the screen recording service 1323.

According to an embodiment, the electronic device 101 may encode an image buffer that has composed images corresponding to a screen area and the remaining area (e.g., dummy area) of the image buffer into an image through the codec 1333 by the surface flinger service 1331 of the software module 1301. A graphic effect (e.g., a blur effect or a color based on some color of an app display screen) may be applied to the remaining area. For example, the electronic device 101 may compose the image corresponding to the remaining area by extracting a color from an image outline and applying the extracted color as a background color by the surfaceflinger service 1331. For example, the electronic device 101 may select a color according to a background theme (e.g., black in the case of a black theme and white in the case of a white theme) by the surfaceflinger service 1331.

According to an embodiment, the electronic device 101 may identify a screen size change based on screen size information received from the flexible driver 1341 and when a screen size has been changed, transmit a screen size change notification to the screen recording service 1323 by the window manager service 1321 of the software module 1301. According to an embodiment, the electronic device 101 may identify that the screen size has been changed during recording of the screen 1411 and dispose the screen 1411 at the center or on a side by screen recording service 1323 of the software module 1301.

Figure 15A:
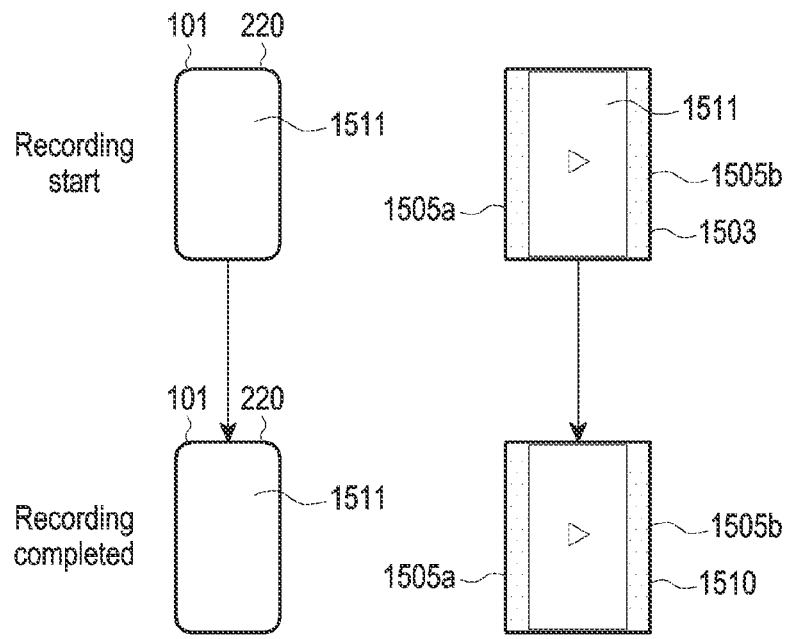
FIGS. 15A, 15B and 15C are diagrams illustrating examples of screen recording in an electronic device according to an embodiment.
Figure 15B:
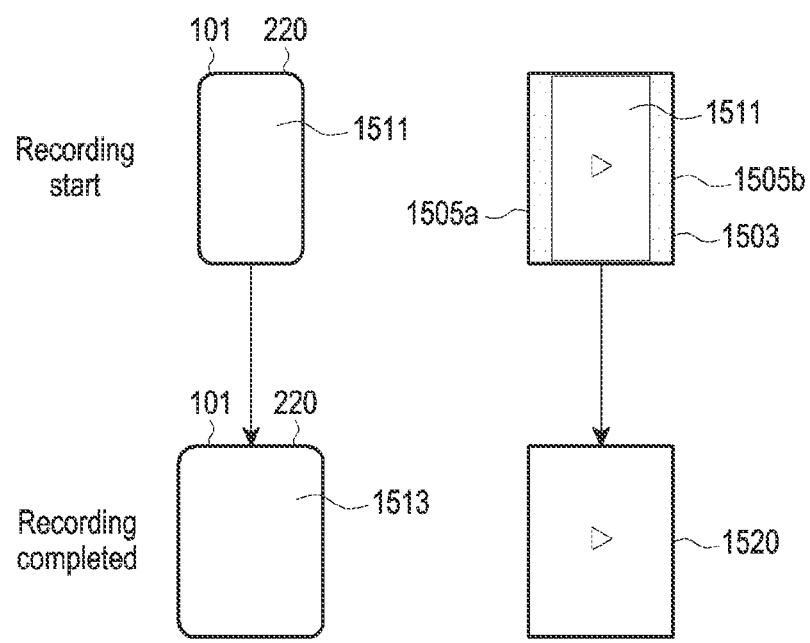
Figure 15C:
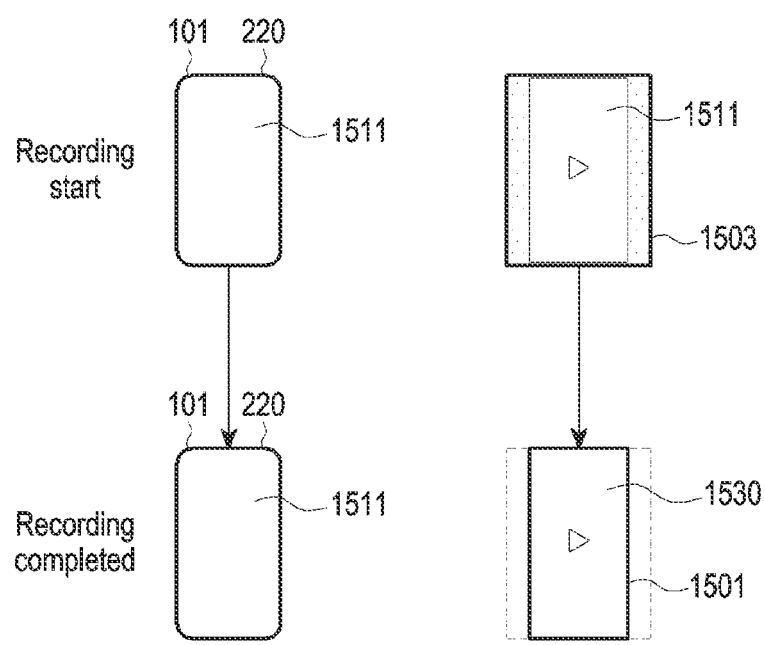

FIGS. 15A, 15B and 15C are diagrams illustrating examples of screen recording in an electronic device according to an embodiment.

Referring to FIGS. 13, 15A, and 15B, according to an embodiment, the electronic device 101 (e.g., the electronic device 101 of FIGS. 1, 2A, 2B, 3A, 3B, 4, 5A, 5B, and 5C) may start screen recording of an exposed area regardless of the contracted or extended state of the display 220, use an image buffer of the extended state, and generate and store a recorded image 1510 of the screen size of the extended state at a recording end time after performing screen recording regardless of contraction or extension of the display 220.

Referring to FIG. 15A, according to an embodiment, when the exposed area of the display 220 is in the contracted state at a recording start time, the electronic device 101 may start recording the screen 1511 in a recording reference screen size 1503 (e.g., an extended screen size). When there is no change in a screen size caused by contraction or extension of the exposed area from the recording start time to a recording end time, the electronic device 101 may end the recording of the screen 1511 in the reference screen size 1503 (e.g., the extended screen size) and store the image 1510 recorded in a size corresponding to the reference screen size 1503. The recorded image 1510 may include dummy areas 1505a and 1505b and the screen 1511. The reference screen size 1503 for recording may be the screen size of a maximum exposed area based on maximum extension of the display 220.

Referring to FIG. 15B, according to an embodiment, the electronic device 101 may start recording the screen 1511 in the reference screen size 1503 in the contracted state (e.g., sliding-in state) of the exposed area of the display 220 at a recording start time. When the screen size is changed to the extended state of the exposed area at a recording end time, the electronic device 101 may end the recording of the screen 1513 extended to the reference screen size 1503, and generate and store a recorded image 1520 corresponding to the reference screen size 1503 for recording.

Referring to FIGS. 13 and 15C, the electronic device 101 according to an embodiment may start screen recording of an exposed area by the soft module 1301 regardless of the contracted or extended state of the display 220, use an image buffer of the extended state, and identify whether to crop a dummy area in a recorded image based on a screen size at a recording end time after performing screen recording according to contraction or extension of the display 220.

According to an embodiment, the electronic device 101 may start recording the screen 1511 in the reference screen size 1503 for recording (e.g., the extended screen size) in the contacted state of the exposed state of the display 220 at a recording start time, and identify whether there are dummy areas 1505a and 1505b, which are areas remaining blank during the recording. According to an embodiment, when the exposed area remains blank in the contracted state at the recording end time and thus the dummy areas 1505a and 1505b exist, the electronic device 101 may set a size (1501) for a final image by cropping the dummy areas 1505a and 1505b in the image 1510 recorded in the reference screen size 1503 for recording and generate a final recorded image 1530 in the set size, as illustrated in FIG. 15C. The final recorded image 1530 may correspond to the size of the screen 1511. According to an embodiment, when the dummy areas 1505*a* and 1505*b* remaining blank do not exist at the recording end time, the electronic device 101 may end the recording of the screen 1513 extended in the reference screen size 1503 for recording (e.g., the extended screen size), and generate and store the recorded image 1520 corresponding to the reference screen size 1503 for recording, as illustrated in FIG. 15B.

Figure 16A:
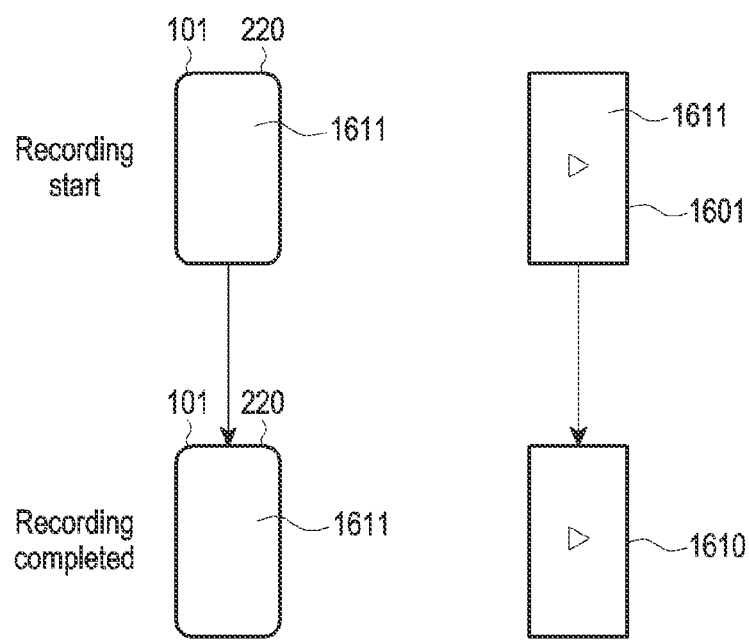
FIGS. 16A and 16B are diagrams illustrating examples of screen recording in an electronic device according to an embodiment.
Figure 16B:
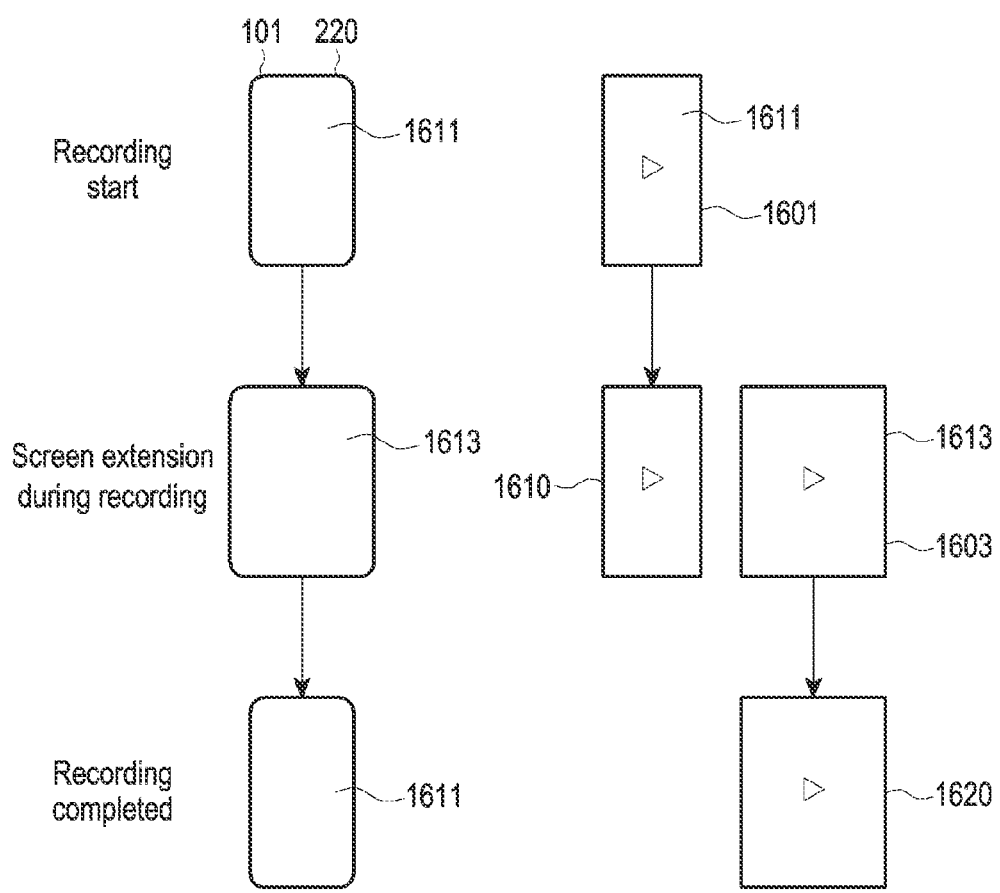

FIGS. 16A and 16B are diagrams illustrating examples of screen recording in an electronic device according to an embodiment.

Referring to FIGS. 13 and 16A, when starting recording by the software module 301, the electronic device 101 (e.g., the electronic device 101 of FIGS. 1, 2A, 2B, 3A, 3B, 4, 5A, 5B, and 5C) according to an embodiment may record a screen 1611 by configuring an image buffer of the contracted state in a screen size 1601 of an exposed area in the contracted state of the display 220. When the recording ends without a change in the screen size 1601 of the exposed area, the electronic device 101 may generate an image 1610 recorded in the screen size 1601 of the contracted state and store the generated image 1610 (e.g., a file through encoding).

Referring to FIGS. 13 and 16B, when starting recording by the software module 301, the electronic device 101 (e.g., the electronic device 101 of FIGS. 1, 2A, 2B, 3A, 3B, 4, 5A, 5B, and 5C) according to an embodiment may record the screen 1611 by configuring the image buffer of the contracted state in the screen size 1601 of the exposed area in the contracted state of the display 220. When the contracted state switches to the extended state due to an increase in the screen size of the exposed area during the recording, the electronic device 101 may generate and store the image 1610 recorded in the screen size 1601 of the exposed area and then record a screen 1613 extended to a reference screen size 1603 for recording (e.g., an extended screen size). Upon completion of the recording, the electronic device 101 may generate and store an image 1620 recorded in the screen size 1601 of the contracted state. According to an embodiment, upon completion of the recording, the electronic device 101 may generate and store a final recorded image (e.g., file) by storing both the image 1610 recorded in the contracted state (e.g., a file obtained by encoding the image buffer of the contracted state) and the image 1620 recorded after the screen size change (e.g., a file obtained by encoding the image buffer of the extended state).

Figure 17A:
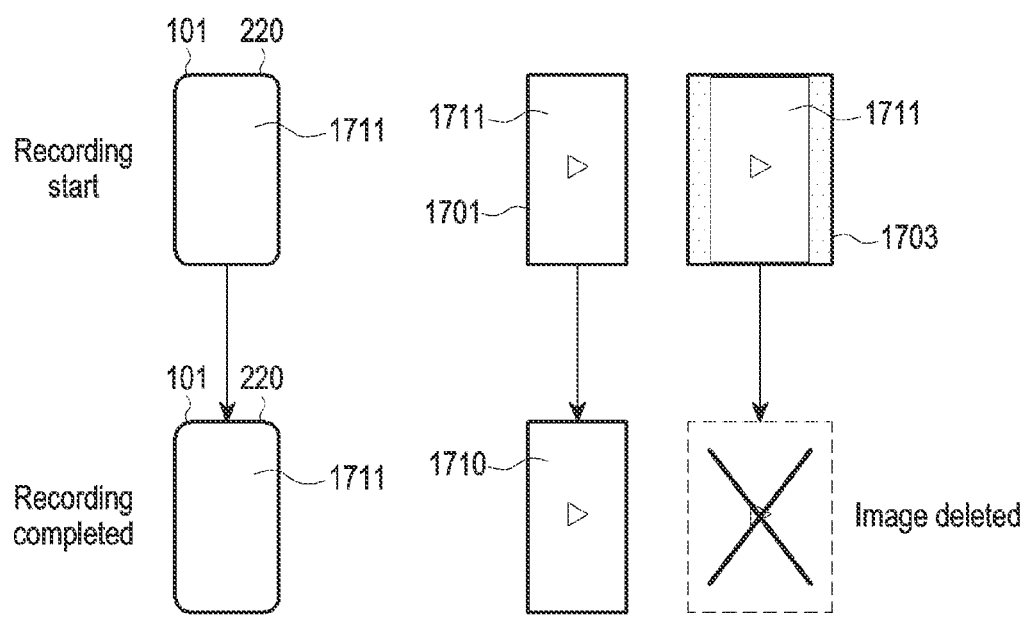
FIGS. 17A and 17B are diagrams illustrating examples of screen recording in an electronic device according to an embodiment.
Figure 17B:
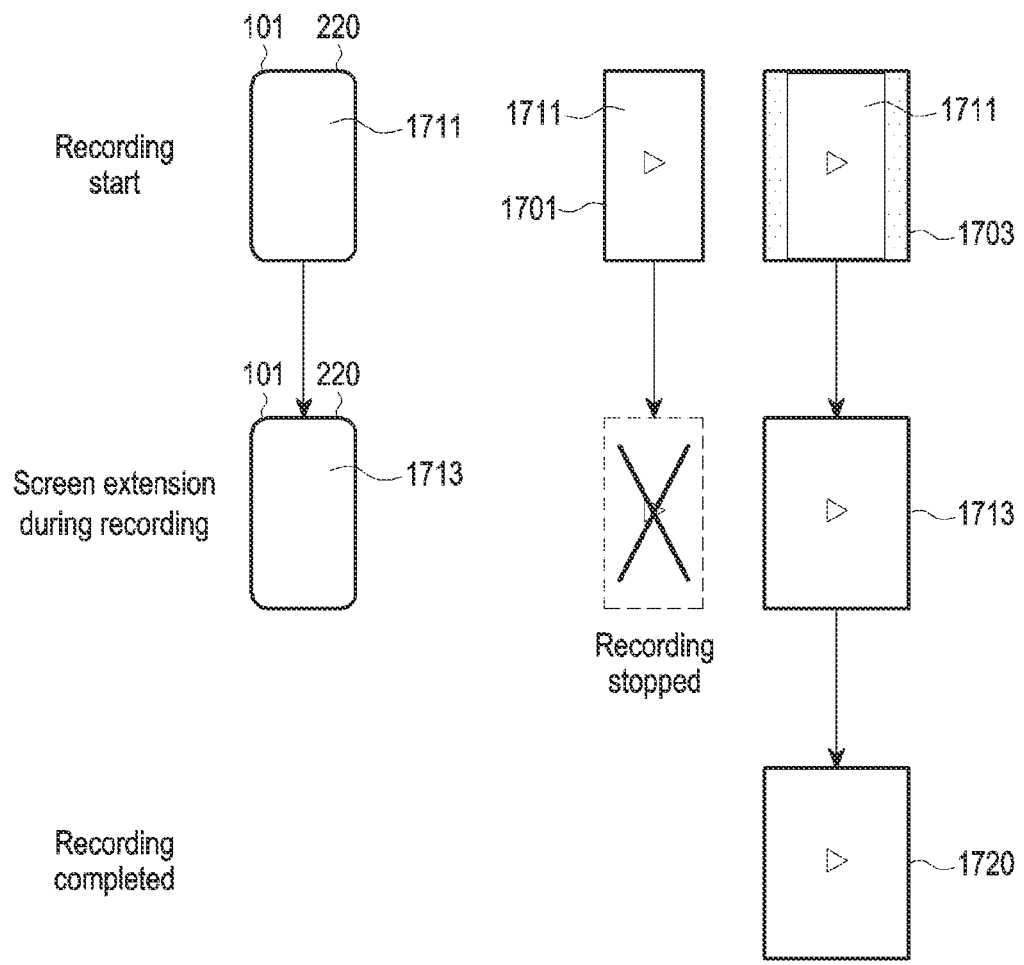

FIGS. 17A and 17B are diagrams illustrating examples of screen recording in an electronic device according to an embodiment.

Referring to FIGS. 13 and 17A, when starting recording in the contracted state of an exposed area by the software module 301, the electronic device 101 (e.g., the electronic device 101 of FIGS. 1, 2A, 2B, 3A, 3B, 4, 5A, 5B, and 5C) according to an embodiment may record a screen 1711 in both a screen size 1701 of the exposed area of the display 220 and a reference screen size 1703. Upon completion of the recording without a change in the screen size 1701 of the exposed area, the electronic device 101 may generate a recoded image 1710 (e.g., configure an image buffer) recorded in the screen size 1701 of the contracted state from a recording start time to a recording end time, store the generated recorded image 1710, and delete an image 1720 recorded in the reference screen size 1703 for recording.

Referring to FIGS. 13 and 17B, when starting recording in the contracted state of an exposed area by the software module 301, the electronic device 101 (e.g., the electronic device 101 of FIGS. 1, 2A, 2B, 3A, 3B, 4, 5A, 5B, and 5C) according to an embodiment may record the screen 1711 in both the screen size 1701 of the exposed area of the display 220 and the reference screen size 1703. According to an embodiment, when the screen size 1701 of the exposed area is changed (e.g., increased), the electronic device 101 may discontinue the recording in the screen size 1701 of the contracted state, and record a screen 1713 in the reference screen size 1703. An image (e.g., image buffer) recorded in the screen size 1701 of the contracted state from a recording start time may be deleted. According to an embodiment, upon completion of the recording, the electronic device 101 may generate, as a final recorded image 1720, an image of the screen 1713 recorded in the reference screen size 1703 from the recording start time to a recording end time, and store the generated final recorded image 1720.

According to an example embodiment, a method of operating an electronic device (e.g., the electronic device 101 of FIGS. 1, 2A, 2B, 3A, 3B, 4, 5A, 5B, 5C, 9A, 9B, 11A, 11B, 12, and FIGS. 14 to 17B) may include: recording a screen of a display (e.g., the display 220 of FIGS. 2A and 2B) of the electronic device displayed in a visible area of the display in a reference screen size, based on a screen size of the visible area being changed by extension or contraction of the visible area of the display during the recording, displaying an object to which a visual effect related to at least one content displayed on the screen is applied, in part of the visible area corresponding to the changed size, and in response to completion of the extension or contraction of the visible area of the display during the recording, displaying an extended or contracted screen in an extended visible area or a contracted exposed area.

According to an example embodiment, the reference screen size may be a screen size of a maximum visible area based on maximum extension of the display.

According to an example embodiment, the method may further include, based on the absence of a change in the screen size based on the extension or contraction of the visible area of the display from a recording start time to a recording end time, storing a recorded image recorded from the recording start time to the recording end time in an output size corresponding to the screen size of the visible area.

According to an example embodiment, the method may further include, based on the presence of a change in a size of the visible area from the recording start time to the recording end time, storing the recorded image recorded from the recording start time to the recording end time in the reference screen size.

According to an example embodiment, displaying the object to which the visual effect related to the at least one content displayed on the screen is applied in the part of the visible area corresponding to the changed size may include, based on the visible area of the display being extended during the screen recording, extending the screen in response to the extension of the visible area, and displaying the object to which the visual effect is applied in the part of the visible area, while making the object larger in response to the extension of the visible area. The extended screen may include a first screen including the at least one content or a second screen including the first screen and another content.

According to an example embodiment, displaying the object to which the visual effect related to the at least one content displayed on the screen is applied in the part of the visible area corresponding to the changed size may include, based on the visible area of the display being contracted during the screen recording, contracting the screen in response to the contraction of the visible area, and displaying the object to which the visual effect is applied in the part of the visible area, while making the object smaller in response to the contraction of the visible area.

According to an example embodiment, recording the screen of the display of the electronic device displayed in the visible area of the display in the reference screen size may include, based on a sensor module of the electronic device detecting that a size of the visible area is equal to or greater than the reference screen size during the screen recording, obtaining a first partial recorded image of the screen displayed in the visible area, based on the sensor module detecting that the size of the visible area is less than the reference screen size during the screen recording, identifying contraction of the visible area based on a first direction, and generating the object to which the visual effect is applied, based on at least one content included in the screen, and obtaining a second partial recorded image of the contracted screen and the object to which the visual effect is applied. The method may further include, upon completion of the screen recording, storing a final recorded image including the first partial recorded image and the second partial recorded image in a memory of the electronic device.

According to an example embodiment, recording the screen of the display of the electronic device displayed in the visible area of the display in the reference screen size may include, based on a sensor module of the electronic device detecting that a size of the visible area is equal to or greater than a size of a first screen and less than the reference screen size during the screen recording, identifying extension of the visible area based on a second direction, generating an object to which a visual effect related to at least one content included in the screen is applied, obtaining a third recorded image of the extended screen and the object to which the visual effect is applied in the extended visible area, and based on the sensor module detecting that the size of the visible area is equal to or greater than the reference screen size during the screen recording, obtaining a fourth recoded image of the extended screen displayed in the extended visible area. The method may further include, upon completion of the screen recording, storing a final recorded image including the third recorded image and the fourth recorded image in the memory of the electronic device.

According to an example embodiment, the method may further include, based on the contraction of the visible area of the display being completed during the recording, storing a final recorded image by synthesizing the object to which the visual effect is applied in a dummy area in a recorded image of a screen displayed in the contracted visible area, in the memory of the electronic device.

According to an example embodiment, the method may further include, based on the display being in a contracted state at a recording start time, recording the screen of the display in both the reference screen size and a screen size of the contracted state, based on the absence of a change in the screen size of the visible area from the recording start time to a recording end time, storing a first recorded image recorded in the screen size of the contracted state at the recording start time and until the recording end time, and deleting a second recorded image recorded in the reference screen size at the recording start time and until the recording end time, and based on the screen size of the visible area being increased during the recording, discontinuing the recording in the screen size of the contracted state, and storing the second recorded image recorded in the reference screen size at the recording start time and until the recording end time.

According to an example embodiment, the method may further include, based on the display being in a contracted state at a recording start time, recording the screen in a screen size of the contracted state without recording in the reference screen size, based on the absence of a change in the screen size of the visible area from the recording start time to a recording end time, storing a first recorded image recorded in the screen size of the contracted state at the recording start time and until the recording end time, and based on the screen size of the visible area being changed during the recording, storing the first recorded image recorded in the screen size of the contracted state from the recording start time, recording the screen in the reference screen size instead of the screen size of the contracted state until the recording end time or a next change time of the screen size, and storing a second recorded image recorded in the reference screen size.

According to an example embodiment, in a non-transitory computer readable storage medium may have stored thereon a program, the program may include executable instructions which when executed by a processor (e.g., the processor 120 of FIG. 1) of an electronic device (e.g., the electronic device 101 of FIGS. 1, 2A, 2B, 3A, 3B, 4, 5A, 5B, 5C, 9A, 9B, 11A, 11B, and 12, and FIGS. 14 to 17B), cause the electronic device to perform operations including: recording a screen of a display (e.g., the display 220 of FIGS. 1A and 2B) of the electronic device displayed in a visible area of the display in a reference screen size, based on a screen size of the visible area being changed by extension or contraction of the visible area of the display during the recording, displaying an object to which a visual effect related to at least one content displayed on the screen is applied, in part of the visible area corresponding to the changed size, and in response to completion of the extension or contraction of the exposed area of the display during the recording, displaying an extended or contracted screen in an extended visible area or a contracted visible area.

According to example embodiments of the disclosure, an object with a visual effect applied thereto in a dummy area together with a screen image is recorded according to a screen size change caused by extension or contraction of a flexible display. Therefore, the use of an adaptive screen recording function in consideration of a change in the screen size of the display may improve usability and prevent and/or reduce failure in properly recognizing a recording area or cropping of the recording area due to the change of the screen size. Besides, various effects directly or indirectly identified from the disclosure may be provided.

The various example embodiments of the disclosure are provided for the purpose of description and understanding of the disclosed, not limiting the technical scope of the disclosure. Accordingly, the scope of the disclosure should be construed as embracing all modifications or various other embodiments based on the technical spirit of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal per se, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing including a first housing part and a second housing part configured to movably engage with the first housing part between a retracted position and an extended position;
display circuitry including a flexible display coupled to the first housing part and the second housing part such that a size of a visible area of the flexible display that is visible from a front side of the housing changes as the second housing part is moved between the retracted position and the extended position;
an actuator configured to move the second housing part with respect to the first housing part;
memory storing instructions; and
at least one processor including processing circuitry,
wherein the instructions, when executed by the at least one processor individually or collectively, cause the electronic device to:
record, in a reference screen size, a screen including at least one content displayed in the visible area of the flexible display, wherein the reference screen size corresponds to a screen size of a maximum visible area of a screen as the second housing part is moved to the extended position, and a recorded image of the screen includes the at least one content and a dummy area based on a screen size of the visible area being different from the reference screen size;
based on identifying that the screen size of the visible area is changed by extension or contraction of the visible area of the flexible display during the recording, control the display circuitry to display a changed screen including the at least one content in a changed visible area and record, in the reference screen size, the changed screen displayed in the changed screen, wherein a recorded image of the changed screen includes the at least one content and the dummy area based on the screen size of the visible area being differing from the reference screen size;

in response to completion of the extension or contraction of the visible area of the flexible display during the recording of the changed screen, control the display circuitry to display an extended or contracted screen in an extended visible area or a contracted visible area, and record the extended or contracted screen in the reference screen size, wherein a recorded image of the contracted screen includes the at least one content and the dummy area; and in response to identifying that the recording has finished, store a final recorded image including images recorded from a recording start time to a recoding end time in the memory.

2. The electronic device of claim 1, wherein the instructions, when executed by the at least one processor individually or collectively, cause the electronic device to: based on absence of a change in the screen size based on the extension or contraction of the visible area of the flexible display from the recording start time to the recording end time, store a recorded image recorded from the recording start time to the recording end time in an output size corresponding to the screen size of the visible area.

3. The electronic device of claim 1, wherein the instructions, when executed by the at least one processor individually or collectively, cause the electronic device to: based on identifying that the screen size of the visible area is changed by extension or contraction of the visible area of the flexible display during the recording, control the display circuitry to display the changed screen including an object to which a visual effect related to at least one content displayed on the screen is applied, in part of the visible area corresponding to the changed size.

4. The electronic device of claim 3, wherein the instructions, when executed by the at least one processor individually or collectively, cause the electronic device to:

based on the visible area of the flexible display being extended during the screen recording, control the display circuitry to extend the screen in response to the extension of the visible area, and control the display circuitry to display the object to which the visual effect is applied in the part of the visible area, while making the object larger in response to the extension of the visible area, wherein the extended screen includes a first screen including the at least one content or a second screen including the first screen and another content.

5. The electronic device of claim 3, wherein the instructions, when executed by the at least one processor individually or collectively, cause the electronic device to based on the visible area of the flexible display being contracted during the screen recording, control the display circuitry to contract the screen in response to the contraction of the visible area, and control the display circuitry to display the object to which the visual effect is applied in the part of the visible area, while making the object smaller in response to the contraction of the visible area.

6. The electronic device of claim 3, further comprising a sensor circuitry including at least one sensor electrically coupled to the at least one processor, wherein the instructions, when executed by the at least one processor individually or collectively, cause the electronic device to:

based on the sensor circuitry detecting that a size of the visible area is equal to the reference screen size during the screen recording, obtain a first partial recorded image of the screen displayed in the visible area, based on the sensor circuitry detecting that the size of the visible area is less than the reference screen size during the screen recording, identify contraction of the visible area based on a first direction, and generate the object to which the visual effect is applied, based on at least one content included in the screen, obtain a second partial recorded image of the contracted screen and the object to which the visual effect is applied, and upon completion of the screen recording, store a final recorded image including the first partial recorded image and the second partial recorded image in the memory.

7. The electronic device of claim 3, further comprising a sensor module including at least one sensor electrically coupled to the at least one processor, wherein the instructions, when executed by the at least one processor individually or collectively, cause the electronic device to:

based on a sensor circuitry detecting that a size of the visible area is equal to or greater than a size of a first screen and less than the reference screen size during the screen recording, identify extension of the visible area based on a second direction, generate an object to which a visual effect related to at least one content included in the screen is applied, and obtain a third recorded image of the extended screen and the object to which the visual effect is applied in the extended visible area, based on the sensor circuitry detecting that the size of the visible area is equal to or greater than the reference screen size during the screen recording, obtain a fourth recoded image of the extended screen displayed in the extended visible area, and upon completion of the screen recording, store a final recorded image including the third recorded image and the fourth recorded image in the memory.

8. The electronic device of claim 3, wherein the instructions, when executed by the at least one processor individually or collectively, cause the electronic device to: based on the contraction of the visible area of the flexible display is completed during the recording, store a final recorded image by synthesizing the object to which the visual effect is applied in a dummy area in a recorded image of a screen displayed in the contracted visible area, in the memory, and wherein the object to which the visual effect is applied is generated based on the at least one content displayed on the screen or another content configured in a hidden area, and a different visual effect is applied according to a displayed position and characteristic of a first screen including the at least one content.

9. The electronic device of claim 1, wherein the instructions, when executed by the at least one processor individually or collectively, cause the electronic device to:

based on the flexible display being in a contracted state at the recording start time, record the screen in both the reference screen size and a screen size of the contracted state, based on absence of a change in the screen size of the visible area from the recording start time to the recording end time, store a first recorded image recorded in the screen size of the contracted state at the recording start time and until the recording end time, and delete a second recorded image recorded in the reference screen size at the recording start time and until the recording end time, and based on the screen size of the visible area being increased during the recording, discontinue the recording in the screen size of the contracted state, and store the second recorded image recorded in the reference screen size at the recording start time and until the recording end time.

10. The electronic device of claim 1, wherein the instructions, when executed by the at least one processor individually or collectively, cause the electronic device to:

based on the flexible display being in a contracted state at the recorded start time, record the screen in a screen size of the contracted state without recording in the reference screen size, based on absence of a change in the screen size of the visible area from the recording start time to the recording end time, store a first recorded image recorded in the screen size of the contracted state at the recording start time and until the recording end time, and based on the screen size of the visible area being changed during the recording, store the first recorded image recorded in the screen size of the contracted state from the recording start time, record the screen in the reference screen size instead of the screen size of the contracted state until the recording end time or a next change time of the screen size, and store a second recorded image recorded in the reference screen size.

11. A method of operating an electronic device comprising a housing including a first housing part and a second housing part configured to movably engage with the first housing part between a retracted position and an extended position, and a flexible display including a visible area that is visible from a front side of the housing, comprising:

recording, in a reference screen size, a screen including at least one content displayed in the visible area of the flexible display, wherein the reference screen size corresponds to a screen size of a maximum visible area of a screen as the second housing part is moved to the extended position, and a recorded image of the screen includes the at least one content and a dummy area based on a screen size of the visible area being different from the reference screen size;

based on identifying that the screen size of the visible area is changed by extension or contraction of the visible area of the flexible display during the recording, displaying a changed screen including the at least one content in a changed visible area and record, in the reference screen size, the changed screen displayed in the changed screen, wherein a recorded image of the changed screen includes the at least one content and the dummy area based on the screen size of the visible area being differing from the reference screen size;

in response to completion of the extension or contraction of the visible area of the flexible display during the recording of the changed screen, displaying an extended or contracted screen in an extended visible area or a contracted visible area, and recording the extended or contracted screen in the reference screen size, wherein a recorded image of the contracted screen includes the at least one content and the dummy area; and in response to identifying that the recording has finished, storing a final recorded image including images recorded from a recording start time to a recoding end time in memory.

12. The method of claim 11, further comprising, based on absence of a change in the screen size based on the extension or contraction of the visible area of the flexible display from the recording start time to the recording end time, storing a recorded image recorded from the recording start time to the recording end time in an output size corresponding to the screen size of the visible area.

13. The method of claim 11, further comprising, based on identifying that the screen size of the visible area is changed by extension or contraction of the visible area of the flexible display during the recording, displaying the changed screen including an object to which a visual effect related to at least one content displayed on the screen is applied, in part of the visible area corresponding to the changed size, wherein displaying the object to which the visual effect related to the at least one content displayed on the screen is applied in the part of the visible area corresponding to the changed size comprises:

based on the visible area of the flexible display being extended during the screen recording, extending the screen in response to the extension of the visible area; and displaying the object to which the visual effect is applied in the part of the visible area, while making the object larger in response to the extension of the visible area, and wherein the extended screen includes a first screen including the at least one content or a second screen including the first screen and another content.

14. The method of claim 11, further comprising, based on identifying that the screen size of the visible area is changed by extension or contraction of the visible area of the flexible display during the recording, displaying the changed screen including an object to which a visual effect related to at least one content displayed on the screen is applied, in part of the visible area corresponding to the changed size, wherein displaying the object to which the visual effect related to the at least one content displayed on the screen is applied in the part of the visible area corresponding to the changed size comprises:

based on the visible area of the flexible display being contracted during the screen recording, contracting the screen in response to the contraction of the visible area; and displaying the object to which the visual effect is applied in the part of the visible area, while making the object smaller in response to the contraction of the visible area.

15. The method of claim 11, further comprising, based on identifying that the screen size of the visible area is changed by extension or contraction of the visible area of the flexible display during the recording, displaying the changed screen including an object to which a visual effect related to at least one content displayed on the screen is applied, in part of the visible area corresponding to the changed size, wherein recording the screen of the flexible display of the electronic device displayed in the visible area of the flexible display in the reference screen size comprises;

based on a sensor circuitry of the electronic device detecting that a size of the visible area is equal the reference screen size during the screen recording, obtaining a first partial recorded image of the screen displayed in the visible area;

based on the sensor circuitry detecting that the size of the visible area is less than the reference screen size during the screen recording, identifying contraction of the visible area based on a first direction, and generating the object to which the visual effect is applied, based on at least one content included in the screen; and obtaining a second partial recorded image of the contracted screen and the object to which the visual effect is applied, and wherein the method further comprises, upon completion of the screen recording, storing a final recorded image including the first partial recorded image and the second partial recorded image in a memory of the electronic device.

16. The method of claim 11, wherein recording the screen of the flexible display of the electronic device displayed in the visible area of the flexible display in the reference screen size comprises;

based on a sensor circuitry of the electronic device detecting that a size of the visible area is equal to or greater than a size of a first screen and less than the reference screen size during the screen recording, identifying extension of the visible area based on a second direction;

generating an object to which a visual effect related to at least one content included in the screen is applied;

obtaining a third recorded image of the extended screen and the object to which the visual effect is applied in the extended visible area; and based on the sensor circuitry detecting that the size of the visible area is equal to the reference screen size during the screen recording, obtaining a fourth recoded image of the extended screen displayed in the extended visible area, and wherein the method further comprises, upon completion of the screen recording, storing a final recorded image including the third recorded image and the fourth recorded image in the memory of the electronic device.

17. The method of claim 11, further comprising, based on identifying that the screen size of the visible area is changed by extension or contraction of the visible area of the flexible display during the recording, displaying the changed screen including an object to which a visual effect related to at least one content displayed on the screen is applied, in part of the visible area corresponding to the changed size; and based on the contraction of the visible area of the flexible display being completed during the recording, storing a final recorded image by synthesizing the object to which the visual effect is applied in a dummy area in a recorded image of a screen displayed in the contracted visible area, in the memory of the electronic device.

18. The method of claim 11, further comprising:

based on the flexible display being in a contracted state at the recoding start time, recording the screen of the flexible display in both the reference screen size and a screen size of the contracted state;

based on absence of a change in the screen size of the visible area from the recording start time to the recording end time, storing a first recorded image recorded in the screen size of the contracted state at the recording start time and until the recording end time, and deleting a second recorded image recorded in the reference screen size at the recording start time and until the recording end time; and based on the screen size of the visible area being increased during the recording, discontinuing the recording in the screen size of the contracted state, and storing the second recorded image recorded in the reference screen size at the recording start time and until the recording end time.

19. The method of claim 11, further comprising:

based on the flexible display being in a contracted state at the recording start time, recording the screen in a screen size of the contracted state without recording in the reference screen size;

based on absence of a change in the screen size of the visible area from the recording start time to the recording end time, storing a first recorded image recorded in the screen size of the contracted state at the recording start time and until the recording end time; and based on the screen size of the visible area being changed during the recording, storing the first recorded image recorded in the screen size of the contracted state from the recording start time, recording the screen in the reference screen size instead of the screen size of the contracted state until the recording end time or a next change time of the screen size, and storing a second recorded image recorded in the reference screen size.

20. A non-transitory computer-readable storage medium having stored thereon a program including executable instructions which, when executed by a processor of an electronic device comprising a housing including a first housing part and a second housing part configured to movably engage with the first housing part between a retracted position and an extended position, and a flexible display including a visible area that is visible from a front side of the housing, cause the electronic device to perform operations comprising:

recording, in a reference screen size, a screen including at least one content displayed in the visible area of the flexible display, wherein the reference screen size corresponds to a screen size of a maximum visible area of a screen based on maximum extension of the flexible display, and a recorded image of the screen includes the at least one content and a dummy area based on a screen size of the visible area being different from the reference screen size;

based on identifying that the screen size of the visible area is changed by extension or contraction of the visible area of the flexible display during the recording, displaying a changed screen including the at least one content in a changed visible area and record, in the reference screen size, the changed screen displayed in the changed screen, wherein a recorded image of the changed screen includes the at least one content and the dummy area based on the screen size of the visible area being differing from the reference screen size;

in response to completion of the extension or contraction of the visible area of the flexible display during the recording of the changed screen, displaying an extended or contracted screen in an extended visible area or a contracted visible area, and recording the extended or contracted screen in the reference screen size, wherein a recorded image of the contracted screen includes the at least one content and the dummy area; and in response to identifying that the recording has finished, storing a final recorded image including images recorded from a recording start time to a recoding end time in memory.

* * * * *